United States Patent
Akiyama et al.

(10) Patent No.: US 10,558,179 B2
(45) Date of Patent: Feb. 11, 2020

(54) SHAFT TORQUE CONTROL DEVICE

(71) Applicants: MEIDENSHA CORPORATION, Tokyo (JP); NATIONAL UNIVERSITY CORPORATION CHIBA UNIVERSITY, Chiba (JP)

(72) Inventors: Takao Akiyama, Tokyo (JP); Takashi Yamaguchi, Tokyo (JP); Kang-Zhi Liu, Chiba (JP); Sho Shimonomura, Chiba (JP)

(73) Assignee: National University Corporation Chiba University, Chiba (JP)

( * ) Notice: Subject to any disclaimer, the term of this patent is extended or adjusted under 35 U.S.C. 154(b) by 0 days.

(21) Appl. No.: 16/319,709

(22) PCT Filed: Jul. 21, 2017

(86) PCT No.: PCT/JP2017/026479
§ 371 (c)(1),
(2) Date: Jan. 22, 2019

(87) PCT Pub. No.: WO2018/016628
PCT Pub. Date: Jan. 25, 2018

(65) Prior Publication Data
US 2019/0278237 A1    Sep. 12, 2019

(30) Foreign Application Priority Data
Jul. 22, 2016   (JP) .................. 2016-144851

(51) Int. Cl.
*G01M 15/02*   (2006.01)
*G05B 13/04*   (2006.01)

(52) U.S. Cl.
CPC ............ *G05B 13/04* (2013.01); *G01M 15/02* (2013.01)

(58) Field of Classification Search
CPC .................................................. G01M 15/02
(Continued)

(56) References Cited

U.S. PATENT DOCUMENTS

| 5,477,740 A | * | 12/1995 | Shioya | ............... G01M 13/025 73/862.191 |
| 2003/0088345 A1 | | 5/2003 | Akiyama et al. | |

(Continued)

FOREIGN PATENT DOCUMENTS

| JP | 2003-149085 A | 5/2003 |
| JP | 2009-133714 A | 6/2009 |

(Continued)

OTHER PUBLICATIONS

Kazuyuki Kimishima et al., "Robust Control of Engine Test Bed for Vehicle Motion Simulation", Transactions of the Japan Society of Mechanical Engineers Series C, 2001, pp. 94 to 101, vol. 67, No. 653.

*Primary Examiner* — Eric S. McCall
(74) *Attorney, Agent, or Firm* — Muncy, Geissler, Olds & Lowe, P.C.

(57) ABSTRACT

A shaft torque control device executes highly responsive shaft-torque control even when spring rigidity of a connection shaft connecting an engine and dynamometer varies, and has a feedback control system including a nominal plant imitating input-output characteristics of a test system, generalized plant having nominal plant; controller providing an input with use of outputs and variation term causing variation in the nominal plant on the basis of a variation transfer function. In the controller, setting is made to satisfy a design condition. Nominal plant is structured with a two-inertia system configured by connecting two inertia bodies via a shaft having spring rigidity equal to a predetermined nominal value set to be a lower limit value in an assumed variation range of spring rigidity of the connection shaft.

(Continued)

The variation transfer function is a positive real function. Spring rigidity in the nominal plant Na increases from the nominal value.

20 Claims, 20 Drawing Sheets

(58) Field of Classification Search
USPC ............... 73/114.13, 114.14, 114.15, 116.05, 73/118.02
See application file for complete search history.

(56) References Cited

U.S. PATENT DOCUMENTS

| | | |
|---|---|---|
| 2010/0251811 A1 | 10/2010 | Akiyama et al. |
| 2015/0142341 A1* | 5/2015 | Akiyama ............ G01M 13/025 702/41 |
| 2015/0219510 A1* | 8/2015 | Takahashi ................. G01L 3/22 702/41 |
| 2016/0109328 A1* | 4/2016 | Kanke ..................... B60L 50/10 73/865.6 |
| 2018/0003589 A1* | 1/2018 | Akiyama .............. G01M 15/04 |
| 2019/0017894 A1* | 1/2019 | Akiyama .............. G01M 15/02 |
| 2019/0229659 A1* | 7/2019 | Tadano ................. G01M 15/02 |

FOREIGN PATENT DOCUMENTS

| | | |
|---|---|---|
| JP | 2012-113676 | 6/2012 |
| JP | 2013-015386 | 1/2013 |

* cited by examiner

INPUT:SHAFT TORUQUE COMMAND
OUTPUT:TORQUE CURRENT COMMAND

INPUT:SHAFT TORUQUE DETECTION
OUTPUT:TORQUE CURRENT COMMAND

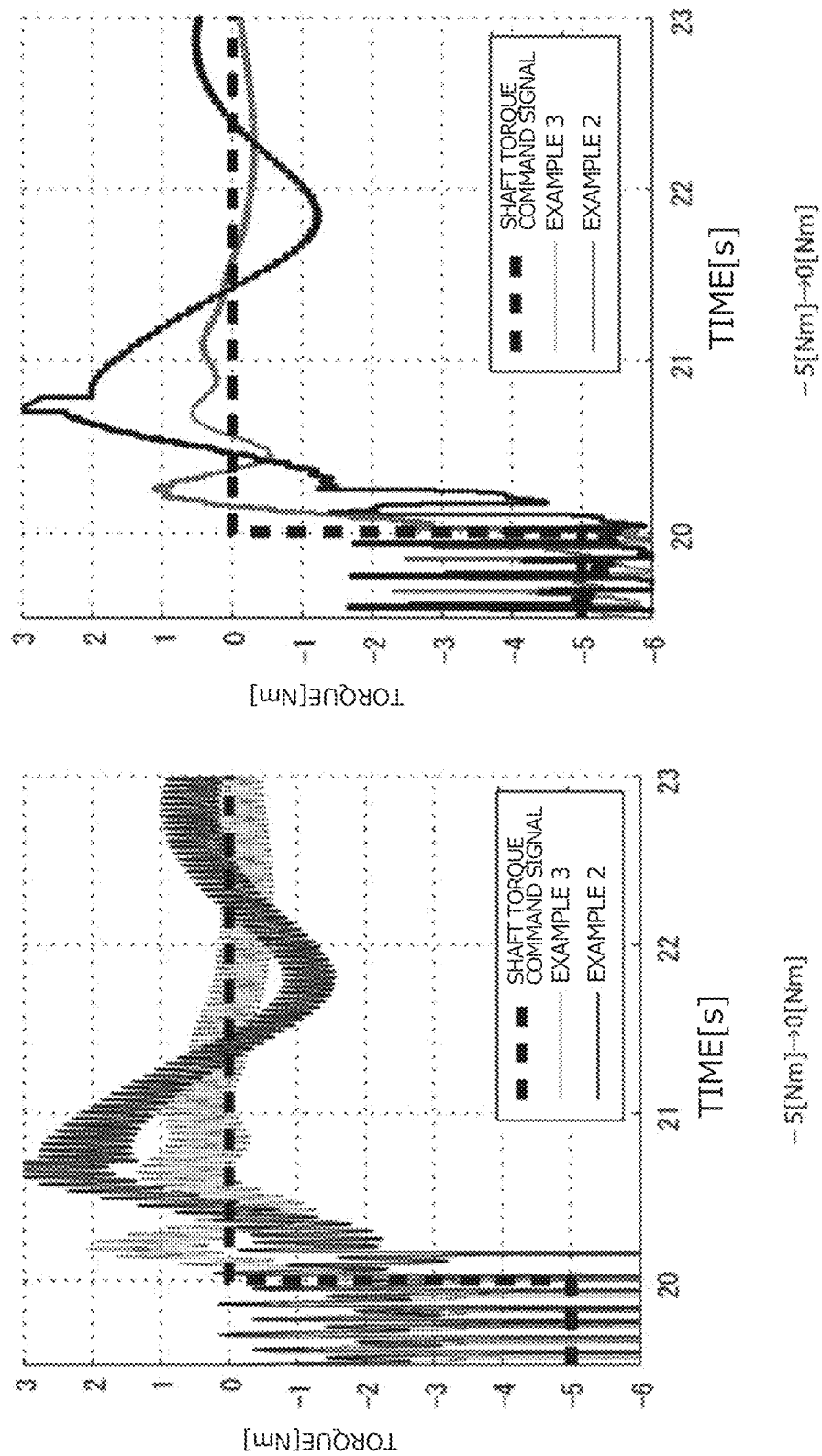

SHAFT TORQUE CONTROL DEVICE

TECHNICAL FIELD

The present invention relates to a shaft torque control device. More specifically, it relates to a shaft torque control device which controls shaft torque at a connection shaft connecting a test piece and a dynamometer.

BACKGROUND ART

An engine bench system measures various characteristics of an engine by joining an engine which is a test piece and a dynamometer by a connection shaft, and controlling the throttle aperture of the engine with a throttle actuator, while using the dynamometer as a power absorber of the engine. A shaft torque meter that detects the shaft torque, which is the torsional torque, is provided to the connection shaft, and upon using the dynamometer as the power absorber, shaft torque control which matches this shaft torque to a predetermined shaft torque command is performed.

Patent Document 1 shows a shaft torque control device according to an I-PD control method. With the engine bench system, resonance may occur in the connection shaft due to the pulsating torque generated at the engine. Therefore, the shaft torque control device of Patent Document 1 realizes the characteristics of the engine bench system by a two-inertia system transfer function, and sets a gain parameter used in I-PD control by designating the frequency of the pole of the fourth-order closed-loop transfer function obtained by the joining of this transfer function and the I-PD control device, as a mechanical resonance frequency of the engine bench system. With the shaft torque control device of Patent Document 1, shaft torque control having a resonance suppressing result thereby becomes possible.

Patent Document 1: Japanese Unexamined Patent Application, Publication No. 2009-133714

DISCLOSURE OF THE INVENTION

Problems to be Solved by the Invention

However, in the general engine bench system, a clutch having a characteristic of the spring rigidity thereof greatly varying is included at the connection shaft which connects the engine and dynamometer. According to the shaft torque control device of Patent Document 1, stable control is possible even in a case of the spring rigidity of the connection shaft varying. However, according to the shaft torque control device of Patent Document 1, since the gain parameter is set with the mechanical resonance frequency when the spring rigidity is low as the reference, the control responsiveness is low.

The present invention has an object of providing a shaft torque control device which can execute highly-responsive shaft torque control even in a case of the spring rigidity of the connection shaft connecting the test piece and dynamometer varying.

Means for Solving the Problems

According to a first aspect of the present invention, a test system (for example, the test system S described later) includes: a test piece (for example, the engine E described later) which generates torque according to a test piece input (for example, the throttle aperture command signal described later), a dynamometer (for example, the dynamometer 2 described later) which generates torque (for example, the dynamo torque described later) according to a torque current command signal, a connection shaft (for example, the connection shaft 3 described later) which has a characteristic of a spring rigidity thereof varying and connects the test piece and the dynamometer, and a shaft torque meter (for example, the shaft torque meter 5 described later) which detects a shaft torque in the connection shaft. A shaft torque control device (for example, the shaft torque control device 7 described later) generates the torque current command signal using a shaft torque detection signal of the shaft torque meter and a shaft torque command signal related to this shaft torque detection signal in such a test system. In a feedback control system (for example, the feedback control system 8 describes later) including: a nominal plant (for example, the nominal plant N, Na, Nb described later) imitating an input-output characteristic of the test system from the test piece input and the torque current command signal until the shaft torque detection signal; a generalized plant (for example, the generalized plant P, Pa, Pb described later) having the nominal plant; a controller (for example, the controller K described later) which gives an input of the generalized plant using output of the generalized plant; and a variation term (for example, the variation term $\Delta$ described later) which imparts variation based on a predetermined variation transfer function (for example, the variation transfer function $\Delta_{PR}(s)$ described later) to the nominal plant, the shaft torque control device comprises the controller which is set so as to satisfy a predetermined design condition. The nominal plant is constructed based on a two-inertia system configured by connecting two inertia fields by a shaft having a spring rigidity of a predetermined nominal value (for example, the nominal value $k_0$ described later); the nominal value is set as a lower limit value (for example, the lower limit value $k_{min}$ described later) in a variation range assumed at a spring rigidity of the connection shaft; and the variation transfer function is a positive real function and is set so as to cause the spring rigidity of the nominal plant to increase from the nominal value. In addition, the design condition is expressed by the following Formulas (1-1) and (1-2) relative to an arbitrary frequency $\omega$, when defining a disturbance input to be inputted to the generalized plant as w, defining an evaluation output to be outputted from the generalized plant as z, defining a variation input to be inputted to the variation term as $\eta$, defining a variation output to be outputted from the variation term as $\xi$, and defining complex conjugate transpositions of the inputs/outputs w, z, $\eta$, $\xi$ as w*, z*, $\eta$*, $\xi$*. Herein, complex conjugate transposition, in the case of the amount serving as the target being a scalar quantity, indicates the complex conjugate reversing the sign of the imaginary part of this scalar quantity, and in the case of the amount serving as the target being a vector quantity, indicates a complex conjugate transposition vector reversing the sign of the imaginary part of each component and substituting with a row component and column component.

$$\xi^*\eta+\eta^*\xi\geq 0 \quad \forall \omega, \eta(j\omega) \tag{1-1}$$

$$z^*z-w^*w<0 \quad \forall \omega, w(j\omega) \tag{1-2}$$

Herein, a stable transfer function G(s), in the case of the following inequality (2) holding true, G(s) is defined as being a positive real function. Herein, G* is the complex conjugate transposed matrix of G. According to Formula (2) below, the real part of the positive real function G(j$\omega$) is positive. In addition, the phase angle of the positive real function is limited to within the range of no more than ±90°.

$$G^*(j\omega)+G(j\omega)\geq 0 \quad \forall \omega \in [0,\infty] \tag{2}$$

In addition, in the case of the following inequality (3) arrived at by further limiting the above inequality (2) holding true, G(s) is defined as being a strictly positive real function.

$$G^*(j\omega)+G(j\omega)>0 \quad \forall \omega \in [0,\infty] \tag{3}$$

According to a second aspect of the present invention, in this case, it is preferable for the controller in the feedback control system to input a control input (for example, the control input u described later) corresponding to the torque current command signal to the nominal plant, and an output produced by weighting the control input by a predetermined first weighting function (for example, the first weighting function Wu described later) to be defined as a first evaluation output (for example, the first evaluation output z1 described later), and for the first weighting function to have larger gain in a high-frequency band than in a low-frequency band.

According to a third aspect of the present invention, in this case, it is preferable, in the feedback control system, for an output produced by weighting a difference between a first disturbance input (for example, the first disturbance input w1 described later) corresponding to the shaft torque command signal and an output (for example, the first observation output y1 described later) of the nominal plant corresponding to the shaft torque detection signal by a predetermined second weighting function (for example, the second weighting function We described later) to be defined as a second evaluation output (for example, the second evaluation output z2 described later), and for the second weighing function to have an integral characteristic.

According to a fourth aspect of the present invention, in this case, it is preferable, in the feedback control system, for an input produced by weighting a second disturbance input (for example, the second disturbance input w2 described later) corresponding to the test piece input by a predetermined third weighting function (for example, the third weighting function Wd described later) to be inputted to the nominal model, and for the third weighting function to have larger gain in a specific frequency band in which variation torque of the test piece increases.

According to a fifth aspect of the present invention, in this case, it is preferable for the nominal plant to be constructed based on a two-inertia system configured by connecting a first inertia field having a moment of inertia (for example, the moment of inertia $J_E$ described later) of the test piece and a second inertia field having a moment of inertia (for example, the moment of inertia $J_D$ described later) of the dynamometer, by a shaft having a spring rigidity of nominal value $k_0$ and loss of nominal value D; in a case of defining a transfer function from a speed difference between the first inertia field and the second inertia field until the shaft torque detection signal in the nominal plant as $G_{a3}(s)$, for a variation input n and variation output of the variation term to be set so as to impart multiplicative variation to the transfer function $G_{a3}(s)$; and for the transfer function $G_{a3}(s)$ and the variation transfer function $\Delta_{PR}(s)$ to be represented by the formulas below with $\delta_D$ and $\delta_K$ as real numbers of at least 0.

$$G_{a3}(s) = \frac{Ds + k_0}{s} \tag{4-1}$$

$$\Delta_{PR}(s) = \frac{\delta_D s + \delta_K}{Ds + k_0} \tag{4-2}$$

According to a sixth aspect of the present invention, in this case, it is preferable, in a case of defining the moment of inertia of the test piece as $J_E$, defining the moment of inertia of the dynamometer as $J_D$, and defining a minute constant as $T_\Delta$, for a transfer function $G_{a1}(s)$ from the sum of torque of the first inertia body and torque of the shaft until revolution speed of the first inertia field and a transfer function $G_{a2}(s)$ from the difference between torque of the second inertia field and torque of the shaft until revolution speed of the second inertia field in the nominal plant to be expressed by the formulas below, respectively.

$$G_{a1}(s) = \frac{T_\Delta s + 1}{J_E s} \tag{5-1}$$

$$G_{a2}(s) = \frac{T_\Delta s + 1}{J_D s} \tag{5-2}$$

According to a seventh aspect of the present invention, in this case, it is preferable for variation input n and variation output ξ of the variation term to be set so as to impart additive variation to the nominal value $k_0$ of spring rigidity in the nominal plant; a fourth weighting function Wη to be set for the variation input η; and for the fourth weighting function Wη and the variation transfer function $\Delta_{PR}$ to be expressed by the below formulas with $k_{min}$ and $k_{max}$ defined as lower limit value and upper limit value of a variation range assumed for the spring rigidity of the connection shaft, respectively, and δ as a real number of at least 0 and no greater than 1.

$$W\eta = k_{max} - k_{min} \tag{6-1}$$

$$\Delta_{PR} = \delta \tag{6-2}$$

According to an eighth aspect, in this case, it is preferable for variation input η and variation output ξ of the variation term to be set so as to impart additive variation to the nominal value $k_0$ of the spring rigidity in the nominal plant; and for the variation transfer function to be a complex number in the range of a circle having a center set on the real axis of a complex plane.

Effects of the Invention

In the first aspect of the present invention, a feedback system is defined to include a nominal plant constructed based on a two-inertia system configured by connecting two inertia field by a shaft having a spring rigidity of a predetermined nominal value; a generalized plant having this nominal plant; a controller which gives outputs to this generalized plant; and a variation term which imparts variation to the nominal plant, and in this feedback control system, the shaft torque control device is configured using a controlled set so as to satisfy the design conditions shown in the above Formulas (1-1) and (1-2). Herein, Formula (1-1) and Formula (1-2) are design conditions proposed in a reference publication (Masao Ono, Kang-Zhi Liu, and Xiaoli Li "A Positive Real Method for Robust Performance Design Problem from An Input-output Signal Approach" Proceedings of SICE2015, pp. 654-659, Hangzhou (2015.07)) by the inventors of the present disclosure. More specifically, Formula (1-1) is an inequality which holds true relative to input-output (n, ξ) in the case of the variation transfer function $\Delta_{PR}(s)$ being a positive real function as shown in Formula (7-1) below, and Formula (1-2) is an inequality established relative to the input-output (w, z) in the case of the H∞ norm of a closed-loop transfer matrix $H_{zw}(s)$ from the disturbance input w until the evaluation output z in the feedback control system 8 being smaller than 1.

$$\Delta_{PR}^*(j\omega)+\Delta_{PR}(j\omega) \geq 0 \quad \forall \omega \in [0, \infty] \quad (7\text{-}1)$$

$$\|H_{zw}(s)\|_\infty < 1 \quad (7\text{-}2)$$

With a conventional robust control system design method, a feedback control system in which the generalized plant and uncertainty are stipulated is defined, and by assigning the sufficient conditions related to robust stability inferred based on the small gain theorem to this feedback control system as the design condition, preferable control device is derived (for example, refer to Yasushi Liu, "Linear Robust Control", Corona Publishing Co., Ltd., 2002). In addition, with the convention design method, the uncertainty relative to the nominal plant is stipulated by norm bounded variation. For this reason, the information related to the phase of uncertainty is ignored, and as a result, there has been a problem in that the control band of the control device cannot be raised to the existing band of uncertainty. In order to solve such a problem, the aforementioned reference publication illustrates a novel design method which targets a system having positive-real variation in which the phase information thereof is usable, and the usefulness thereof. More specifically, with the target of a system having positive-real variation, it shows that a control device design under the novel design conditions related to robust performance illustrated in the above Formulas (1-1) and (1-2) can broaden the control band so far as the existing band of uncertainty compared to a device designed by the conventional robust control system design method, and can improve the robust performance.

The present invention configures the nominal plant based on a two-inertia system having spring rigidity of a nominal value, prescribes this nominal value as the lower limit value of a variation ranged assumed for the spring rigidity of the connection shaft of an actual test system, and further uses a function which is a positive real function and causes the spring rigidity of the nominal plant to increase from the nominal value as a variation transfer function. The design method based on the above-mentioned reference publication, i.e. designing with the above Formulas (1-1) and (1-2) as design conditions a shaft torque control device such that satisfies these conditions, thereby becomes possible. Consequently, according to the shaft torque control device of the present invention, it is possible to realize highly-responsive shaft torque control even in a case of the spring rigidity of the connection shaft varying.

In the second aspect of the present invention, by defining an output produced by weighted by the first weighting function having a larger gain in the high frequency band than in the low frequency band by the control input to be inputted from the controller to the nominal plant as the first evaluation output, it is possible to reduce the gain in the high frequency band of the shaft torque control device ultimately obtained. Therefore, even in a case of detection noise being included in the shaft torque detection signal from the shaft torque meter, it is possible to suppress a torque current command generated based on this shaft torque detection signal from greatly oscillating, and thus realize stable control.

According to the third aspect of the present invention, by defining an output produced by weighting the difference between the first disturbance input corresponding to the shaft torque command signal and the output of the nominal plant corresponding to the shaft torque detection signal by the second weighting function having an integral characteristic, since it is possible to include an integrator relative to the control deviation between the shaft torque command signal and shaft torque detection signal in the shaft torque control device ultimately obtained, it is possible to realize shaft torque control in which control deviation does not occur.

According to the fourth aspect of the present invention, a value produced by weighting the second disturbance input corresponding to the test piece input by the third weighting function having larger gain in a specific frequency band in which the variation torque of the test piece increases is inputted to the nominal plant. It is thereby possible to improve the suppression performance of variation torque of the test piece, which is a disturbance.

According to the fifth aspect of the present invention, the variation term in the nominal plant constructed based on a two-inertia system is set so as to impart multiplicative variation to the transfer function $G_{a3}(s)$ from the speed difference between the first inertia field and second inertia field until the shaft torque detection signal, and the variation transfer function $\Delta_{PR}(s)$ is further set as shown in the above Formula (4-2) using $\delta_D$, which is a real number of at least 0. By setting the variation transfer function $\Delta_{PR}(s)$ in this way, the variation transfer function $\Delta_{PR}(s)$ satisfies the positive real condition of the above Formula (2) and causes the spring rigidity to increase from the nominal value $k_0$ by $\delta_D$; therefore, it is possible to obtain a highly-responsive shaft torque control device conforming to the design conditions illustrated in the above Formulas (1-1) and (1-2).

According to the sixth aspect, as one consequence of the design conditions of the aforementioned Formulas (1-1) and (1-2), it is demanded that the closed-loop transfer function $H_{\eta\xi}$ from the variation output $\xi$ until the variation input $\eta$ of the feedback control system is a strictly positive real function (refer to above Formula (3)). In the present invention, by newly introducing the minute constant $T_A$, the two transfer functions $G_{a1}(s)$ and $G_{a2}(s)$ in the nominal plant are set as in Formulas (5-1) and (5-2), respectively. In the present invention, by configuring the transfer function of the nominal plant by a plant correcting from the plant inferred from the equation of motion of a two-inertia system using the minute constant $T_A$, it is possible to satisfy the strictly positive real property of the aforementioned closed-loop transfer function $H_{\eta\xi}$, while causing the characteristic of the moment of inertia of the test piece and/or dynamometer to be appropriately reflected.

The seventh aspect of the present invention, in the nominal plant constructed based on the two-inertia system, defines the nominal value $k_0$ of the spring rigidity as the lower limit value $k_{min}$ of the variation range assumed for the spring rigidity (i.e. $k_0=k_{min}$), sets the variation term so as to impart additive variation to the above-mentioned nominal value k0, sets a constant obtained by subtracting the lower limit value $k_{min}$ from the upper limit value $k_{max}$ of the variation range in the variation input $\eta$ fas the fourth weighting function $W\eta$, and further defines the variation transfer function $\Delta_{PR}$ as $\delta$, which is a real number of at least 0 and no greater than 1. By setting the fourth weighting function and variation transfer function in this way, the variation transfer function $\Delta_{PR}$ can satisfy the positive real condition of the above Formula (2) and cause the spring rigidity to increase from the nominal value $k_0$ to $k_{max}$. It should be noted that, according to the present invention, since it is possible to cause the upper limit value $k_{max}$ of the spring rigidity to be reflected in the design of the controller via the fourth weighting function $W\eta$, it is possible to obtain a shaft torque control device of higher responsiveness compares to the invention as described in the sixth aspect.

The eighth aspect of the present invention, in the nominal plant constructed based on the two-inertia system, sets the variation term so as to impart additive variation to the nominal value k0 of the spring rigidity, and further defines the variation transfer function as a complex number in the range of a circle having a center set on the real axis of the complex plane. By limiting the variation range to within a finite range for both the real axis and imaginary axis, it is possible to improve the control performance, while raising the robustness relative to a rigidity change in a range considering the real mechanical properties, compared to the invention as described in the seventh aspect.

BRIEF DESCRIPTION OF THE DRAWINGS

FIG. 19B is a graph showing a step responses of a shaft torque command signal in the test system to which the shaft torque control devices of Example 3 and Example 2 are applied.

PREFERRED MODE FOR CARRYING OUT THE INVENTION

Figure 1:
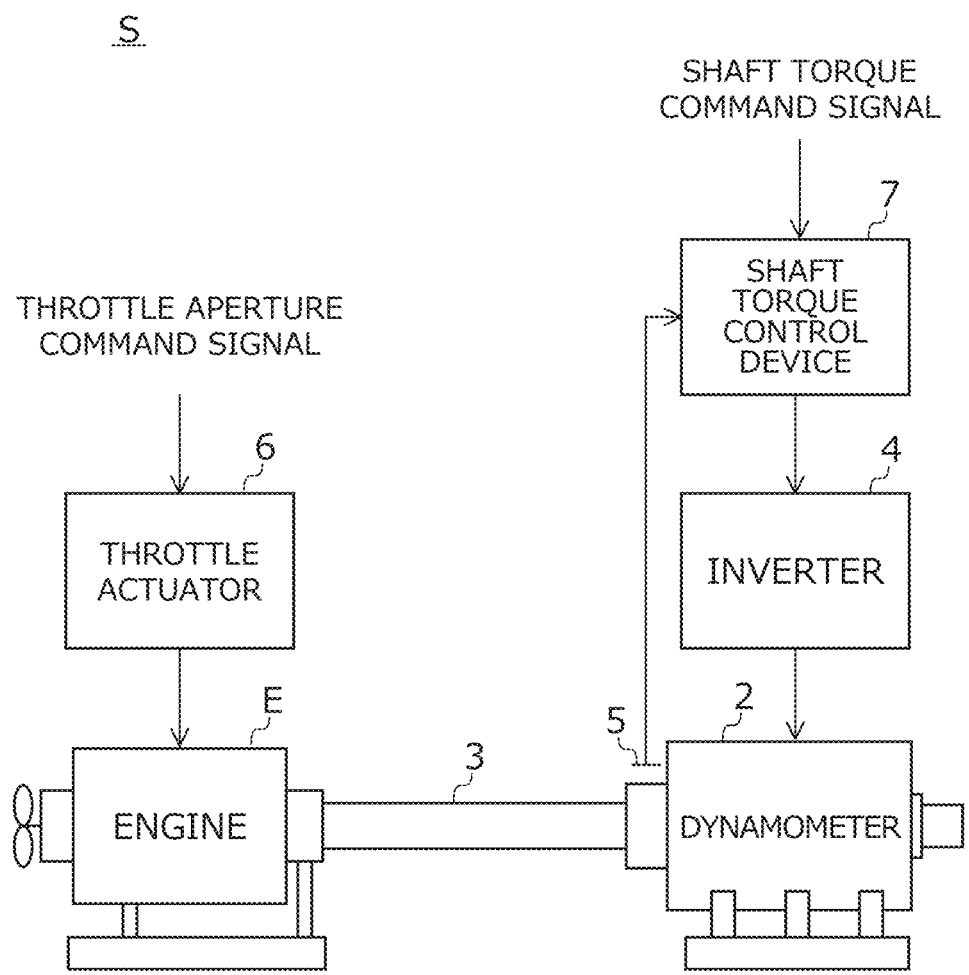
FIG. 1 is a view showing the configuration of a test system in which a shaft torque control device according to an embodiment of the present invention is used.

Hereinafter, an embodiment of the present invention will be explained in detail while referencing the drawings. FIG. 1 is a view showing the configuration of a test system S in which a shaft torque control device 7 according to the present embodiment is used. The test system S includes an engine E, which is the test piece, a dynamometer 2, a connection shaft 3, an inverter 4, a shaft torque meter 5, a throttle actuator 6, and a shaft torque control device 7. The test system S is a so-called engine bench system which measures various characteristics of the engine E, by using the dynamometer 2 as the power absorber of the engine E, while controlling the throttle aperture of the engine E by the throttle actuator 6.

The throttle actuator 6, when the throttle aperture command signal corresponding to the command relative to the throttle aperture of the engine E is inputted, controls the throttle aperture of the engine E so as to realize this, and thereby causes the engine torque according to the throttle aperture command signal to be generated by the engine E.

Figure 2:
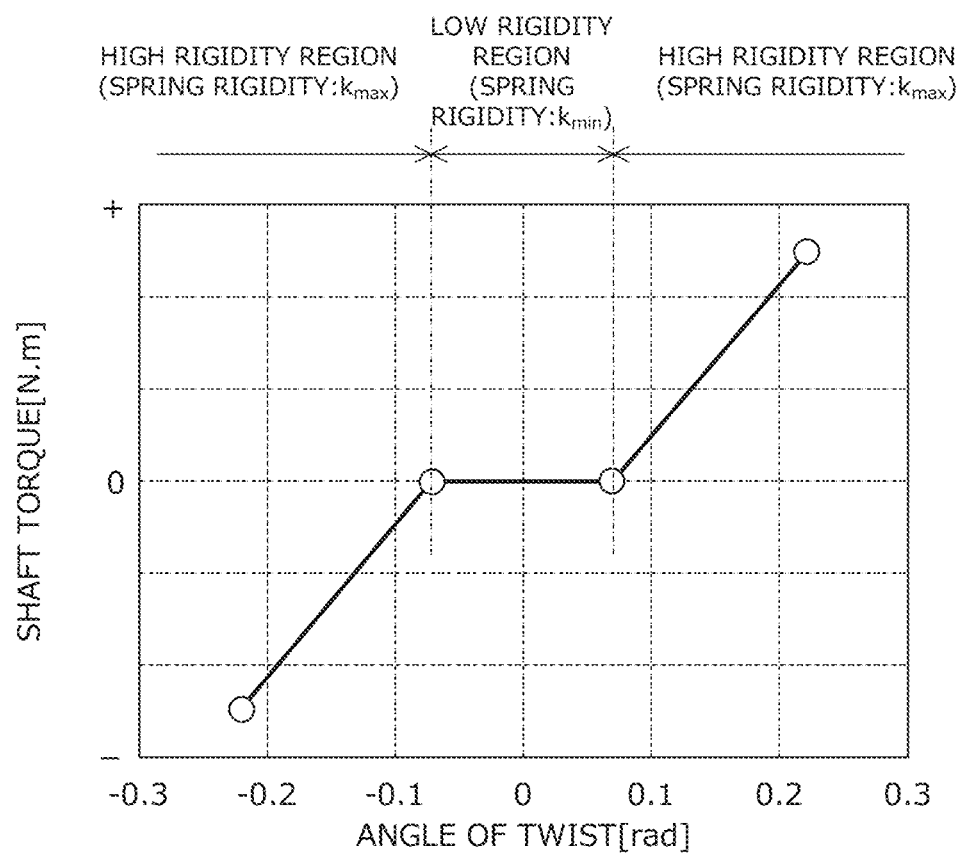
FIG. 2 is a view showing an example of the relationship between the angle of twist and shaft torque of the connection shaft.

The connection shaft 3 connects the output shaft of the engine E and the output shaft of the dynamometer 2. The connection shaft 3 includes a clutch, and thus has a characteristic of the spring rigidity thereof varying within a predetermined range. FIG. 2 is a view showing an example of the relationship between the angle of twist (rad) and shaft torque (Nm) of the connection shaft. In FIG. 2, the slope corresponds to the spring rigidity. The spring rigidity of the connection shaft has a characteristic of being small within a low rigidity region in which the angle of twist includes 0 (rad), and is large in a high rigidity region which is outside this low rigidity region. In other words, in the example of FIG. 2, a lower limit value $k_{min}$ of a variation range of the spring rigidity corresponds to the spring rigidity in a state in which the connection shaft is in the low rigidity region, and an upper limit value $k_{max}$ corresponds to the spring rigidity in a state in which the connection shaft is in the high rigidity region.

Referring back to FIG. 1, the shaft torque control device 7 generates a torque current command signal corresponding to a command relative to torque generated by the dynamometer 2 using this shaft torque command signal and shaft torque detection signal, so that there is no longer a shaft torque control deviation, which is a difference between the shaft torque command signal set by the processing (not shown) and the shaft torque detection signal from the shaft torque meter 5, and then inputs this to the inverter 4. The inverter 4 supplies electric power according to the torque current command signal inputted from the shaft torque control device 7 to the dynamometer 2, and thereby causes dynamo torque according to the torque current command signal to be generated by the dynamometer 2.

Figure 3:
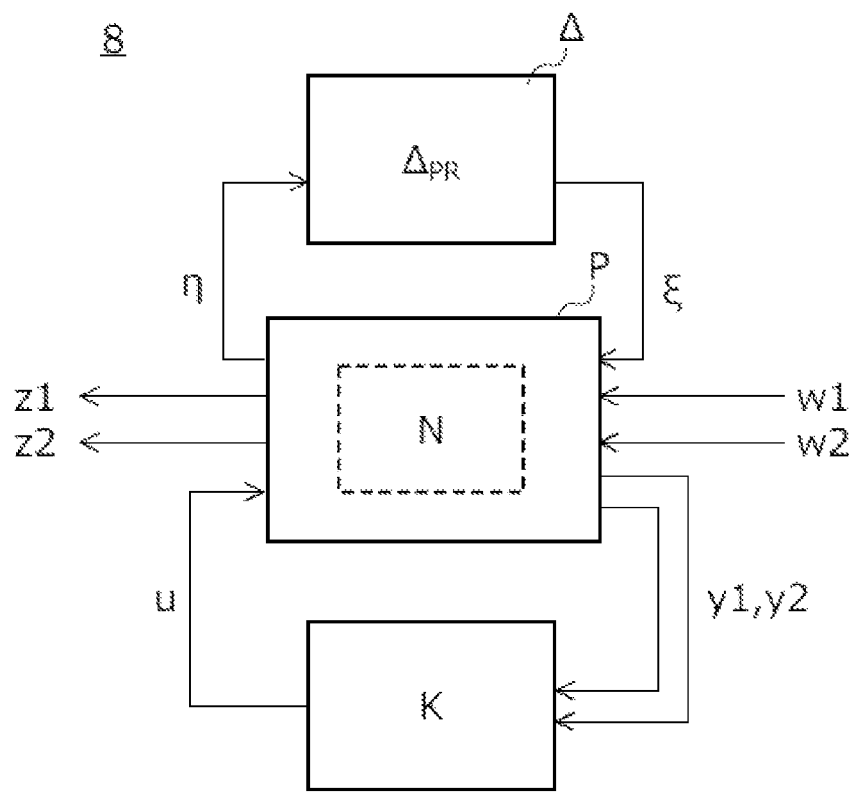
FIG. 3 is a view showing the configuration of a feedback control system used upon designing a shaft torque control device.

The shaft torque control device 7 performing the above such shaft torque control is configured by defining a feedback control system 8 such as that shown in FIG. 3, and implementing a controller designed so that predetermined design conditions are satisfied in this feedback control system 8, in a computer.

The feedback control system 8 of FIG. 3 is configured by combining a generalized plant P having a nominal plant N imitating the input-output characteristics of the test system S from the input of the engine E and input of the dynamometer 2 until the output of the shaft torque meter 5; a controller K giving the input-output to this generalized plant P, and a variation term Δ imparting variation on the nominal plant N.

Inputs constituted by a first disturbance input w1 corresponding to the shaft torque command signal and a second disturbance input corresponding to the engine torque generated by the engine E according to the throttle aperture command signal; and outputs constituted by a first evaluation output z1 corresponding to a weighted torque current command signal and a second evaluation output z2 corresponding to a weighted shaft torque control deviation are defined in the generalized plant P. Hereinafter, a vector quantity establishing the first disturbance input w1 and second disturbance input w2 as components is noted as w, and a vector quantity establishing the first evaluation output z1 and second evaluation output z2 as components is noted as z. It should be noted that the specific configuration of the generalized plant P will be explained in detail for every example while referencing FIGS. 5 and 6 later.

Figure 4:
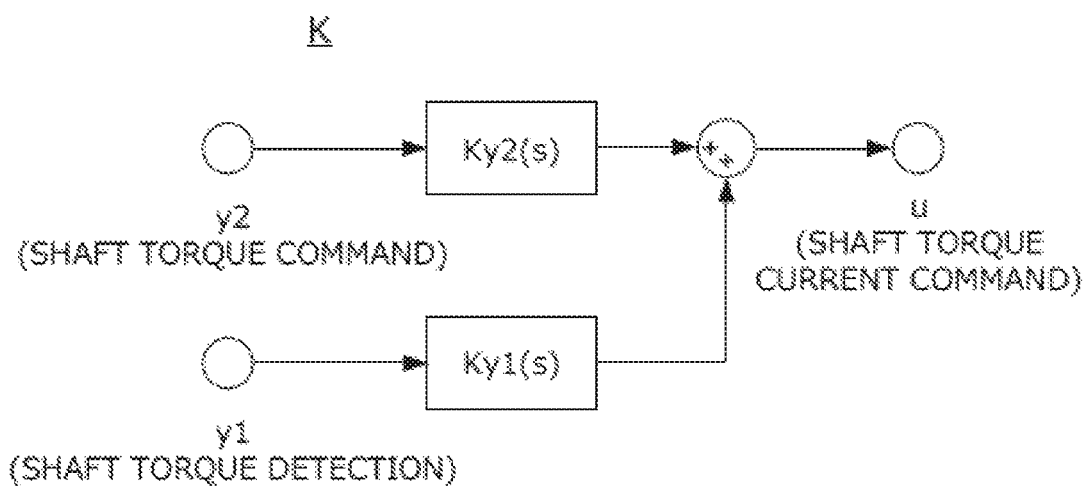
FIG. 4 is a view showing the configuration of a controller derived based on the feedback control system of FIG. 3.

In addition, a first observation output y1 corresponding to the shaft torque detection signal and a second observation output y2 corresponding to the shaft torque command signal; and the control input u corresponding to the torque current command signal are defined between the generalized plant P and controller K. By setting the above such input-output signals between the generalized plant P and the controller K, the controller K of a two-degrees-of-freedom control system configured by combining the two transfer functions Ky1(s) and Ky2(s), and outputting the control input u from the first observation output y1 and second observation output y2 is derived, as shown in FIG. 4.

Referring back to FIG. 3, a variation input η which is a scalar quantity and a variation output ξ which is a scalar quantity are defined between the generalized plant P and variation term Δ.
the variation term Δ imparts variation to the nominal plant N, by imparting the variation output ξ generated from the variation input η outputted from the generalized plant P based on the variation transfer function $\Delta_{PR}(s)$, which is a positive real function, to the generalized plant P. It should be noted that the specific configuration of this variation transfer function $\Delta_{PR}(s)$ will be explained in detail for every example later.

The shaft torque control device 7 is configured by deriving the controller K such that satisfies the below inequalities (8-1) and (8-2) relative to an arbitrary frequency ω in the feedback control system 8 in which the above such inputs/outputs (w, z, η, ξ) are defined, and implementing this in a computer. In the below Formulas (8-1) and (8-2), w* and z* are complex conjugate transposition vectors of the disturbance input w and evaluation output z, which are each vector quantities, and η* and ξ* are complex conjugates of the variation input η and variation output ξ, which are each scalar quantities.

$$\zeta^*\eta+\eta^*\zeta \geq 0 \quad \forall \omega, \eta(j\omega) \tag{8-1}$$

$$z^*z-w^*w<V0 \quad \forall \omega(j\omega) \tag{8-2}$$

Herein, the above Formula (8-1) is an inequality established related to the input-output (η, ξ) of the variation term Δ in the case of the variation transfer function $\Delta_{PR}(s)$ assumed to be a positive real function, as explained by referencing formula (7-1). In addition, the above Formula (8-2) is an inequality established relative to the input-output (w, z) in the case of the H∞ norm of a closed-loop transfer matrix $H_{zw}(s)$ from the disturbance input w until the evaluation output z in the feedback control system 8 being smaller than 1, as explained by referencing Formula (7-2).

Example 1

Figure 5:
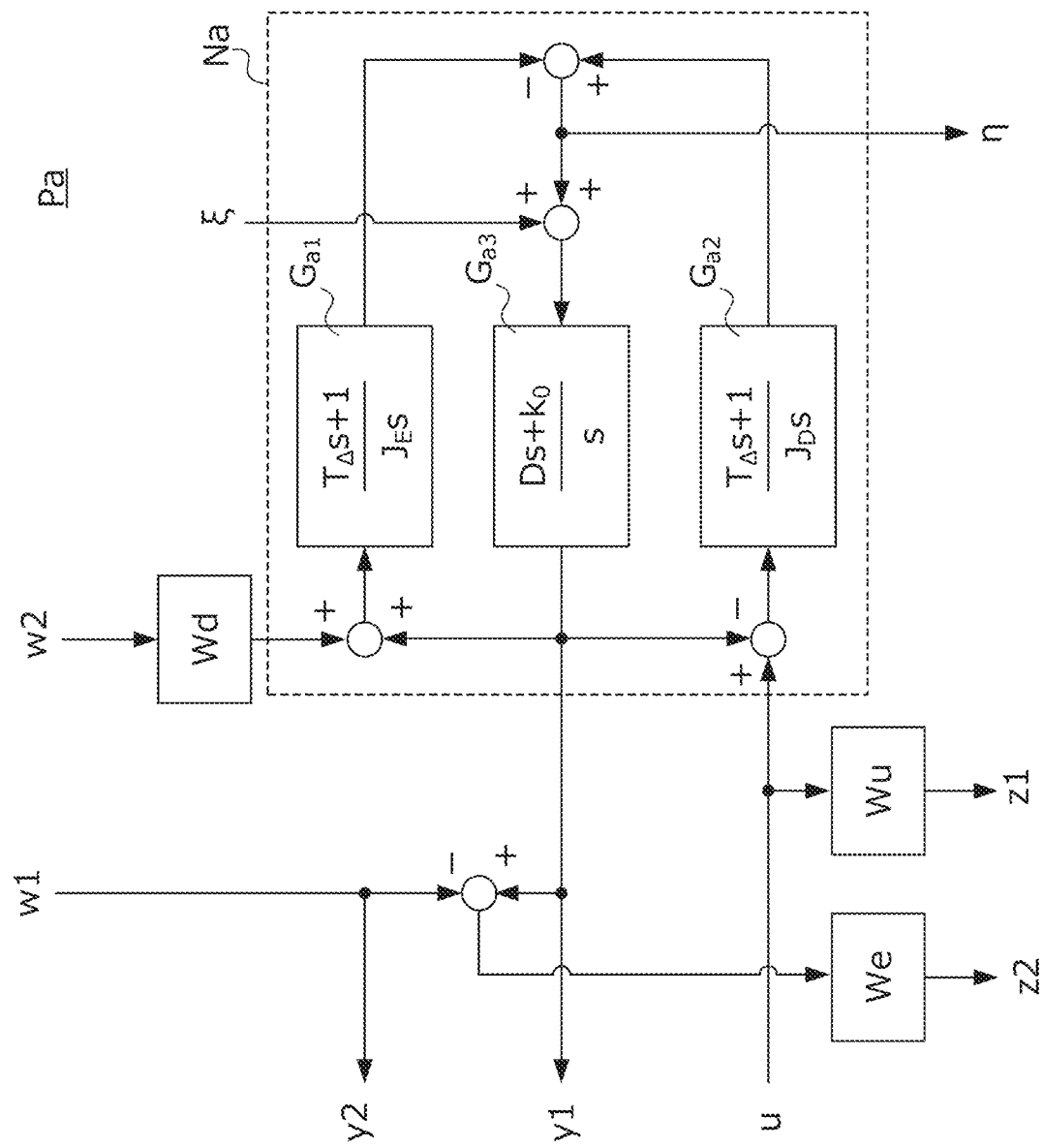
FIG. 5 is a view showing the configuration of a generalized plant used in the design of a shaft torque control device of Example 1.

Next, the shaft torque control device of Example 1 and the design method thereof will be explained. FIG. 5 is a view showing the configuration of a generalized plant Pa used in the design of a shaft torque control device of Example 1.

The generalized plant Pa of Example 1 is configured by combining a nominal plant Na imitating the input-output characteristics from the engine torque according to the throttle aperture command signal and the dynamometer torque according to the torque current command signal until the shaft torque according to the shaft torque detection signal in the test system S of FIG. 1, and a plurality of weighting functions Wu(s), We(s) and Wd(s).

The nominal plant Na is constructed based on the equation of motion of a two-inertia system configured by connecting a first inertia field having a moment of inertia $J_E$ of the engine E and a second inertia field having a moment of inertia $J_D$ of the dynamometer 2 by a shaft having a spring rigidity of predetermined nominal value $k_0$ and loss of predetermined nominal value D. This nominal plant Na is configured by combining as shown in FIG. 5 a transfer function Ga1(s) (refer to following Formula (9-1)) from the sum of engine torque and shaft torque until the revolution speed of the first inertia field corresponding to the engine revolution speed; a transfer function Ga2(s) (refer to following Formula (9-2)) from the difference between dynamometer torque and shaft torque until the revolution speed of the second inertia field corresponding to the dynamo revolution speed; and a transfer function Ga3(s) (refer to following Formula (9-3)) from the difference between the engine revolution spend and dynamo revolution speed until the shaft torque.

$$G_{a1}(s) = \frac{T_\Delta s+1}{J_E s} \tag{9-1}$$

$$G_{a2}(s) = \frac{T_\Delta s+1}{J_D s} \tag{9-2}$$

$$G_{a3}(s) = \frac{Ds+k_0}{s} \tag{9-2}$$

In the nominal plant Na configured by combining the three transfer functions, the moment of inertia of the engine E and the moment of inertia of the dynamometer 2 acquired by known methods can be used as the moments of inertia $J_E$, $J_D$. As the nominal value D of loss of the shaft, a predetermined positive value can be used. In addition, the nominal value $k_0$ of spring rigidity of the shaft is determined as the lower limit value $k_{min}$ of a variation range assumed for the spring rigidity of the connection shaft 3 used in the test system S ($k_0=k_{min}$). Herein, lower limit value $k_{min}$ of the variation range of spring rigidity is the value of the spring rigidity when the connection shaft is within a low rigidity range in the example of FIG. 2.

In addition, $T_A$ in the above Formulas (9-1) and (9-2) is a minute real number introduced in order to establish the closed-loop transfer function $H_{\eta\xi}$ from the variation output ξ until the variation input η of the feedback control system as the strictly positive real function shown in the above Formula (3). Herein, when setting the minute constant $T_A$ in the above Formulas (9-1) and (9-2) as 0, the transfer function of the nominal plant Na equals the equation of motion of a two-inertia system; however, the controller K becomes $H_{\eta\xi}*(j\infty)+H_{\eta\xi}(j\infty)=0$ under the assumption of being proper, and the closed-loop transfer function $H_{\eta\xi}$ does not satisfy the strictly positive real condition of Formula (3). It should be noted that demand for the above-mentioned closed-loop transfer function $H_{\eta\xi}$ to be a strictly positive real function is directed from the design conditions shown in Formulas (8-1) and (8-2). If setting the resonance frequency as $\omega_{MAX}$ when the spring rigidity of the connection shaft 3 in the test system S is the upper limit value $k_{max}$ of the above-mentioned variation range, this minute constant $T_A$ is determined as a value on the order of $0.001/\omega_{MAX}$. Herein, the upper limit value $k_{max}$ in the variation range of the spring rigidity is the value of the spring rigidity when the connection shaft is in the high rigidity region in the example of FIG. 2. By setting the minute constant $T_A$ as such a value, the minute constant $T_A$ comes to be ignorable in the low-frequency range from 1000 times the resonance frequency, and the nominal plant Na substantially matches a plant derived based on the equation of motion of the two-inertia system; therefore, the characteristics of the moment of inertia of the engine E and the moment of inertia of the dynamometer 2 can be appropriately reflected.

A plurality of input-output signals consisting of a first disturbance input w1, second disturbance input w2, first evaluated output z1, second evaluated output z2, control input u, first observation output y1, second observation output y2, variation input η and variation output ξ are defined in the generalized plant Pa of FIG. 5. The corresponding relationship between these input-output signals and the test system S in FIG. 1 is as follows.

The first disturbance input w1 is an input signal to the generalized plant Pa, and corresponds to a shaft torque command signal. The second disturbance input w2 is an input signal to the generalized plant Pa, and corresponds to the throttle aperture command signal or the engine torque generated by inputting this throttle aperture command signal to the throttle actuator. The value arrived at by weighting this second disturbance input w2 by a third weighting function Wd(s) is inputted to the nominal plant Na as engine torque.

The third weighting function Wd(s) is a weighting function expressing the magnitude of variation torque of the engine E, and more specifically, a transfer function is used having large gain in a specific frequency band in which the variation torque of the engine E increases. It is thereby possible to raise the suppression performance of the engine torque, which is a disturbance.

The control input u is an input signal to the generalized plant Pa from the controller K, and corresponds to the torque current command signal. This control input u is inputted to the nominal plant Na as dynamo torque. The first observation output y1 is an input signal to the controller K from the generalized plant Pa, and corresponds to the shaft torque detection signal. As this first observation output y1, the output of the nominal plant Na can be used. The second observation output y2 is an input signal to the controller K from the generalized plant Pa, and corresponds to the shaft torque command signal. As this second observation output y2, the first disturbance input w1 can be used as is (w1=y2).

The first evaluation output z1 is an output signal of the generalized plant Pa, and corresponds to a weighted torque current command signal. As this first evaluation output z1, an output arrived at by weighting the control input u corresponding to the torque current command signal by the first weighting function Wu(s) in the aforementioned way can be used. The second evaluation output z2 is an output signal of the generalized plant Pa, and corresponds to a weighted shaft torque control deviation. As this second evaluation output z2, an output arrived at by weighting the difference between the first observation output y1 corresponding to the shaft torque detection signal and the first disturbance input w1 corresponding to the shaft torque command signal by the second weighting function We(s) in the aforementioned way can be used.

The first weighting function Wu(s) is a weighting function related to the torque current command signal, and a transfer function having larger gain in the high frequency band than the low frequency band can be used. It is thereby possible to cause the gain in the high frequency band of the shaft torque control device to decline. Therefore, the shaft torque control device derived by setting such a weighting function Wu(s), even in the case of noise being included in the shaft torque detection signal, can suppress a torque current command signal generated based on this shaft torque detection signal from greatly oscillating, and thus realize stable control.

The second weighting function We(s) is a weighting function related to the shaft torque control deviation, and a transfer function having an integral characteristic can be used. Since the shaft torque control device derived by setting such a weighting function We(s) comes to include an integrator relative to the shaft torque control deviation, it is possible to realize shaft torque control which decreases the control deviation as a result.

The variation input η is an input signal from the generalized plant Pa to the variation transfer function $\Delta_{PR}(s)$ of the variation term Δ, and the variation output is an input signal from the variation transfer function $\Delta_{PR}(s)$ to the generalized plant Pa. As shown in FIG. 5, this variation input η and variation output ξ are set so as to impart multiplicative variation on the transfer function $Ga_3(s)$ from the difference between the engine revolution speed and dynamo revolution speed until the shaft torque in the nominal plant Na.

In addition, the variation transfer function $\Delta_{PR}(s)$, due to configuring so as to impart variation which causes the spring rigidity and loss of this shaft to increase from the respective nominal values $k_0$ and D, is expressed by the following Formula (10) with $\delta_K$ and $\delta_D$ each as real numbers of at least 0.

$$\Delta_{PR}(s) = \frac{\delta_D \cdot s + \delta_K}{D \cdot s + k_0} \quad (10)$$

The shaft torque control device of Example 1 is designed so as to satisfy the design conditions shown in Formulas (8-1) and (8-2) in the feedback control system in which the above such generalized plant Pa is stipulated.

Example 2

Figure 6:
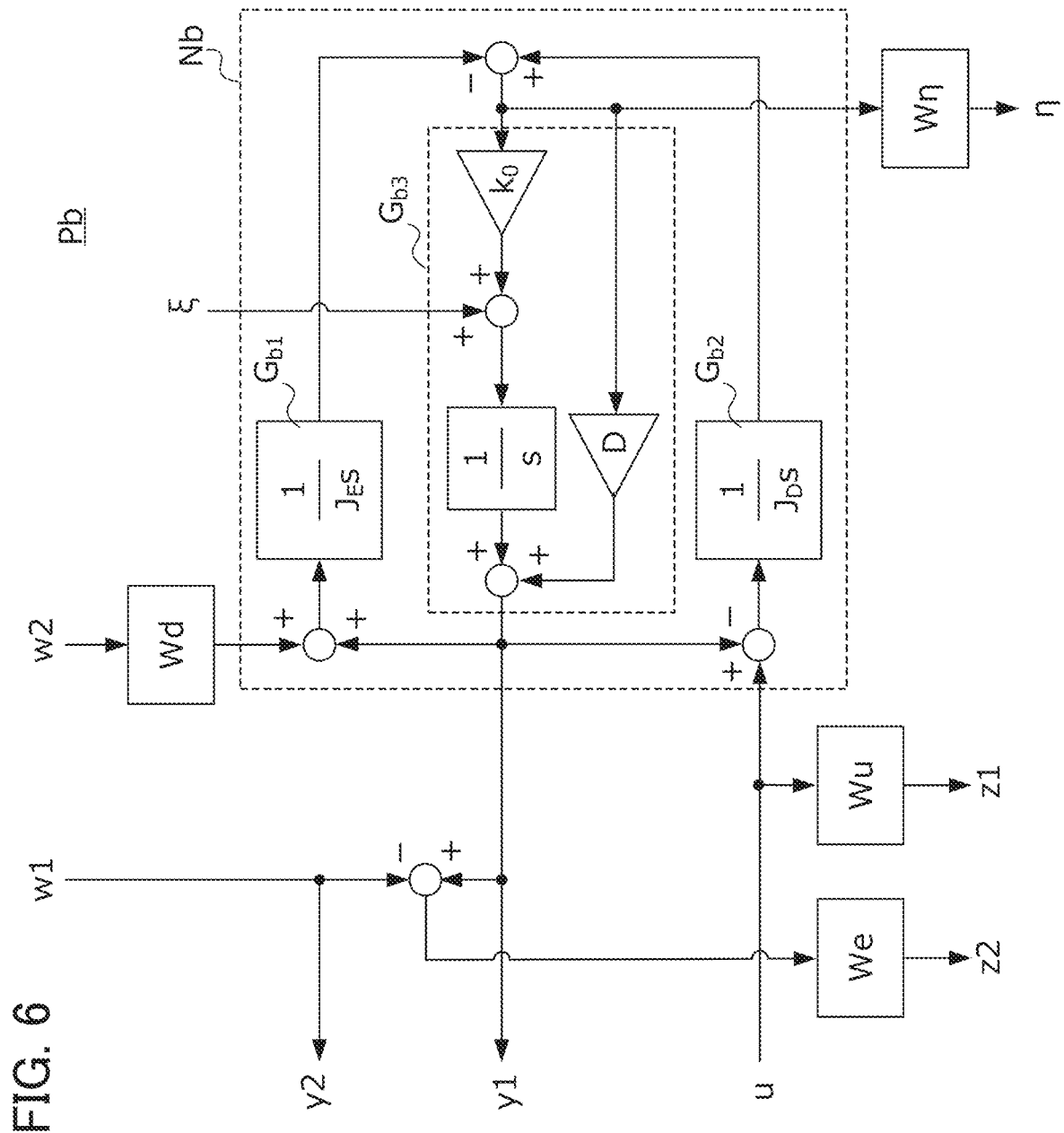
FIG. 6 is a view showing the configuration of a generalized plant used in the design of a shaft torque control device of Example 2.

Next, a shaft torque control device of Example 2 and a design method thereof will be explained. FIG. 6 is a view showing the configuration of a generalized plant Pb used in the design of a shaft torque control device of Example 2. The generalized plant Pb of Example 2 differs from the generalized plant Pa of Example 1 shown in FIG. 5 in the configuration of the nominal plant Nb, settings of the variation input η and variation output ξ, the setting of the fourth weighting function Wη, and the configuration of the variation transfer function $\Delta_{PR}(s)$. In the following explanation of the generalized plant Pb, explanations for configurations which are the same as the generalized plant Pa will be omitted.

The generalized plant Pb is configured by combining the nominal plant Nb imitating the input-output characteristics of the test system S from the engine torque and dynamo torque until the shaft torque, and a plurality of weight functions Wu(s), We(s), Wd(s), Wη(s), similarly to the nominal plant Na of Example 1.

The nominal plant Nb is constructed based on the equation of motion of a two-inertia system configured by connecting a first inertia field having a moment of inertia $J_E$ of the engine E and a second inertia field having a moment of inertia $J_D$ of the dynamometer 2, by a shaft having a predetermined spring rigidity of the nominal value $k_0$ and the loss of the predetermined nominal value D. This nominal plant Nb is configured by combining a transfer function $G_{b1}(s)$ (refer to following Formula (11-1)) from the sum of the engine torque and shaft torque until the revolution speed (engine revolution speed) of the first inertia field corresponding to the engine; a transfer function $G_{b2}(s)$ (refer to following Formula (11-2)) from the difference between the dynamo torque and the shaft torque until the revolution speed (dynamo revolution speed) of the second inertia field corresponding to the dynamometer; and the transfer function $G_{b3}(S)$ (refer to following Formula (11-3)) from the difference between the engine revolution speed and dynamo revolution speed until the shaft torque, as shown in FIG. 6.

$$G_{b1}(s) = \frac{1}{J_E s} \quad (11\text{-}1)$$

$$G_{b2}(s) = \frac{1}{J_D s} \quad (11\text{-}2)$$

$$G_{b3}(s) = D + \frac{k_0}{s} \quad (11\text{-}3)$$

The variation input η is an input signal from the generalized plant Pa weighted by the fourth weighting function $W_\eta$ until the variation transfer function $\Delta_{PR}$ of the variation term Δ, and the variation output is an input signal from the variation transfer function $\Delta_{PR}$ to the generalized plant Pa. As shown in FIG. 6, this variation input η and variation output ξ are set so as to impart multiplicative variation to the nominal value $k_0$ of the spring rigidity of the shaft in the nominal plant Nb. It should be noted that, with the generalized plant Pb of Example 2, by setting the variation input η and variation output ξ in this way, since the closed-loop transfer function $H_{\eta\xi}$ from the variation output ξ until the variation input η becomes a strictly positive real function, it is not necessary to introduce the minute constant $T_\Delta$ as in the generalized plant Pa of Example 1.

The fourth weighting function Wη, in order to reflect the upper limit value $k_{max}$ of the variation range assumed in the spring rigidity in the design of the shaft torque control device, shall be a constant obtained by subtracting the lower limit value $k_{min}$ from the upper limit value $k_{max}$ as shown in the following Formula (12-1). In addition, the variation transfer function $\Delta_{PR}$ shall be δ, which is a real number of at least 0 and no greater than 1 as shown in the following Formula (12-2) in order to configure so as to impart variation on the nominal plant Nb causing the spring rigidity of the shaft thereof to increase from the nominal value $k_0$.

$$W\eta = k_{max} - k_{min} \quad (12\text{-}1)$$

$$\Delta_{PR} = \delta \quad (12\text{-}2)$$

The shaft torque control device of Example 2 is designed so as to satisfy the design conditions shown in Formulas (8-1) and (8-2) in the feedback control system in which the above such generalized plant Pb is stipulated.

Next, the characteristics of the shaft torque control devices of Example 1 and Example 2 configured in the above way will be explained while comparing with the characteristics of a prior art shaft torque control device, with the shaft torque control device illustrated in Japanese Unexamined Patent Application, Publication No. 2009-133714 by the applicants of the present disclosure as the prior art.

Figure 7A:
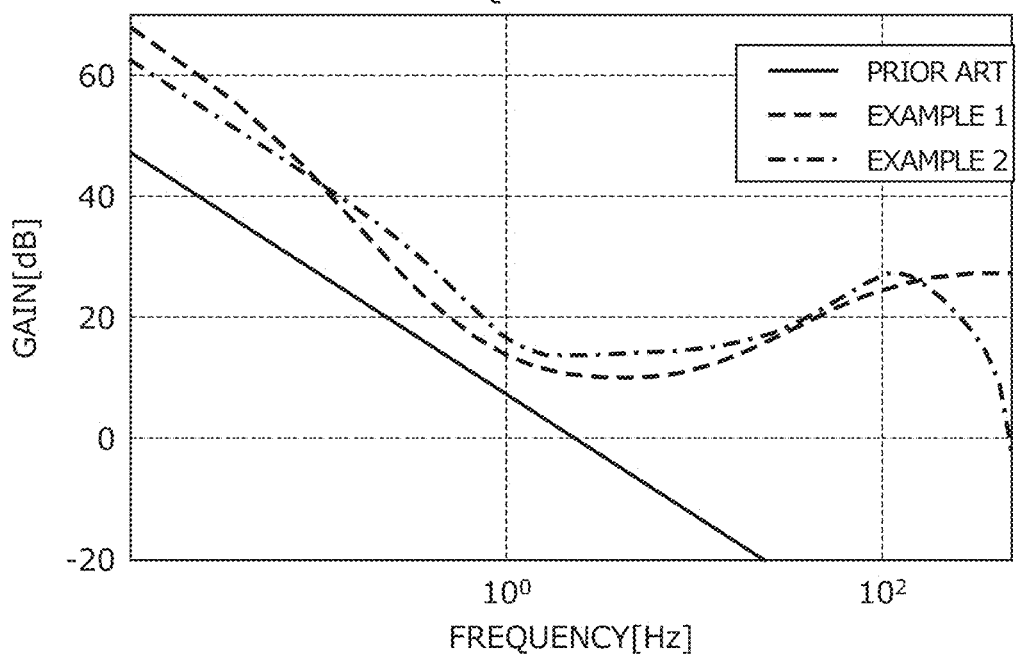
FIG. 7A is a graph showing gain characteristics of a torque current command signal relative to a shaft torque command signal of a shaft torque control device of Examples 1, 2 and the prior art.
Figure 7B:
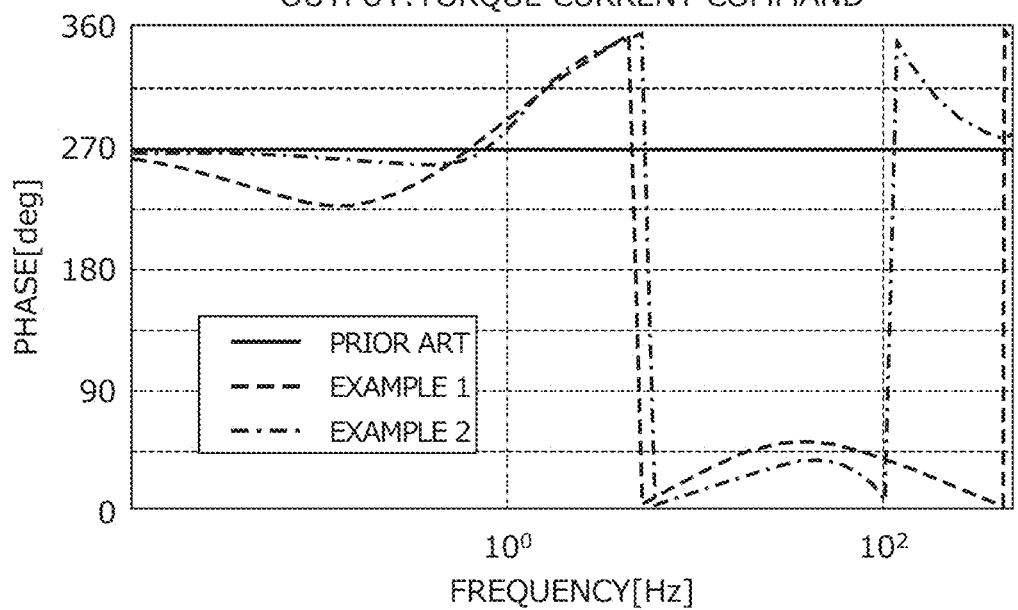
FIG. 7B is a graph showing phase characteristics of a torque current command signal relative to a shaft torque command signal of a shaft torque control device of Examples 1, 2 and the prior art.
Figure 8A:
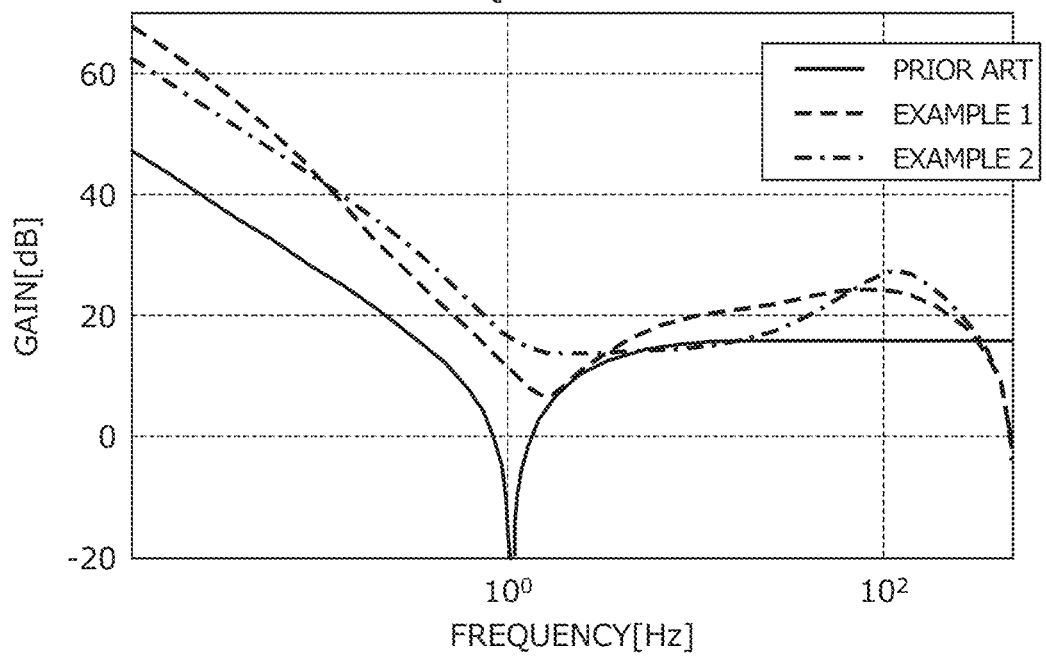
FIG. 8A is a graph showing gain characteristics of a torque current command signal relative to a shaft torque detection signal of a shaft torque control device of Examples 1, 2 and the prior art.
Figure 8B:
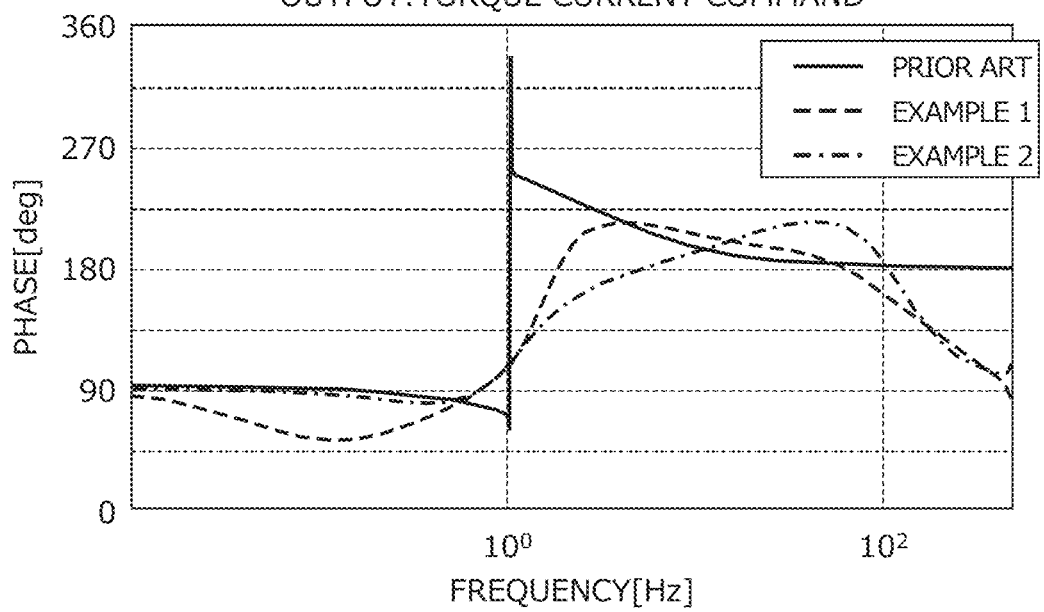
FIG. 8B is a graph showing phase characteristics of a torque current command signal relative to a shaft torque detection signal of a shaft torque control device of Examples 1, 2 and the prior art.

FIGS. 7A and 7B are graphs showing gain characteristics and phase characteristics (i.e. characteristics of Ky2(s) in FIG. 4) of a torque current command signal relative to a shaft torque command signal of the shaft torque control devices of Examples 1, 2 and the prior art, respectively. FIGS. 8A and 8B are graphs showing the characteristics of torque current command signal (i.e. characteristics of Ky(s) in FIG. 4) relative to the shaft torque detection signal in the shaft torque control devices of Examples 1, 2 and the prior art. These FIGS. 7A, 7B, 8A and 8B show the characteristics of the prior art by a solid line, show the characteristics of Example 1 by a dotted line, and show the characteristics of Example 2 by a chain line.

As shown in these FIGS. 7A, 7B, 8A and 8B, in the frequency band in which integral characteristic of no more than about 1 Hz is expressed, control having gain on the order of about 20 dB larger than the shaft torque control device of the prior art is obtained for both the shaft torque control devices of Example 1 and Example 2. Therefore, according to the shaft torque control devices of Examples 1 and 2, there is high responsiveness relative to the shaft torque command signal and responsiveness to engine torque compared to the shaft torque control device of the prior art. In addition, when comparing Example 1 and Example 2, in the band of 1 to tens of Hz, the gain becomes greater for the shaft torque control device of Example 1 than the shaft torque control device of Example 2. Therefore, the shaft torque control device of Example 2 is considered able to achieve control response of higher responsiveness than the shaft torque control device of Example 1.

Next, control response examples for a test system applying the shaft torque control devices of the prior art, and Examples 1 and 2 will be explained, while referencing FIGS. 9 to 14.

Figure 9:
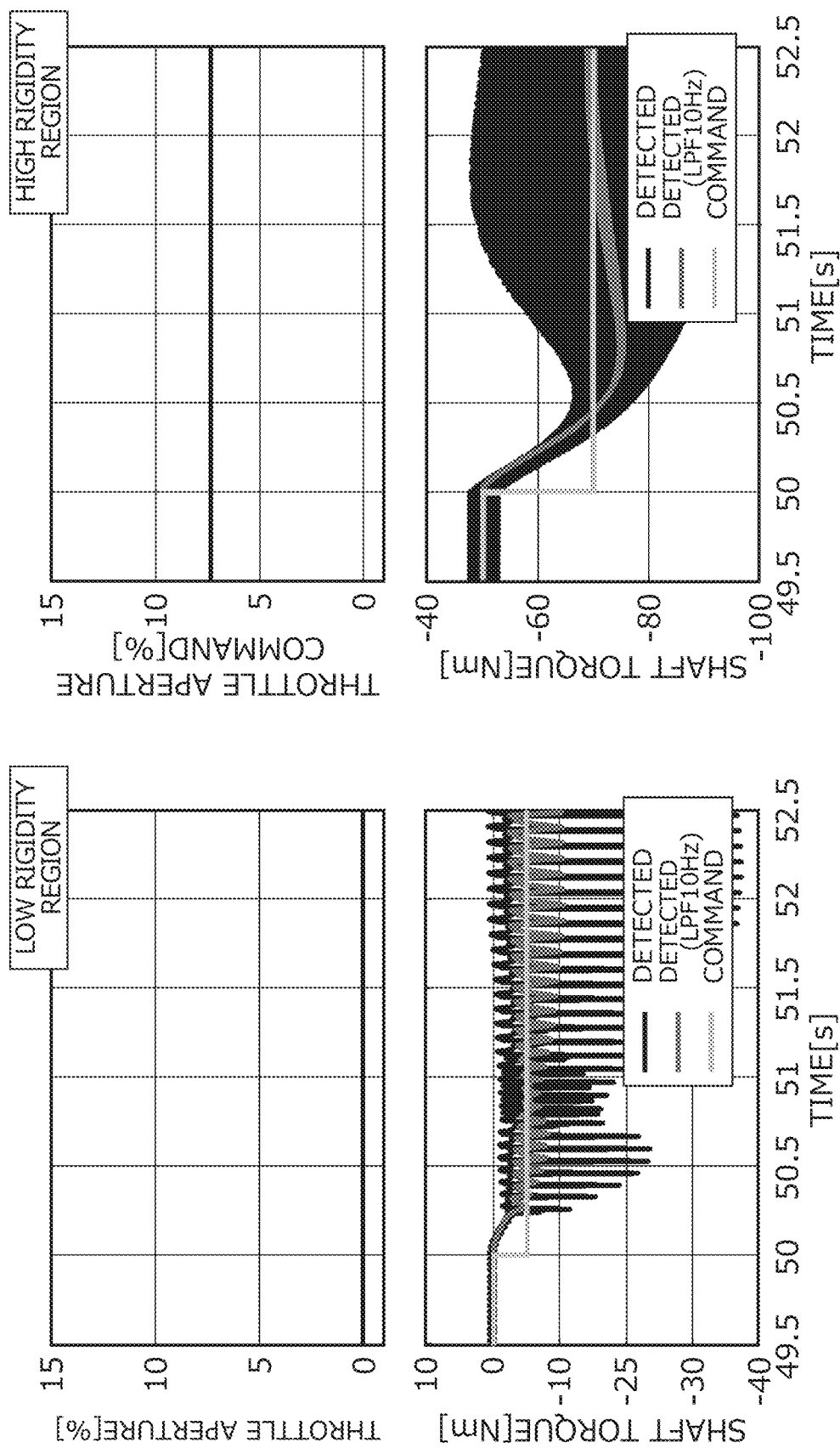
FIG. 9 provides graphs showing step responses of a shaft torque command signal in a test system to which the shaft torque control device of the prior art is applied.
Figure 10:
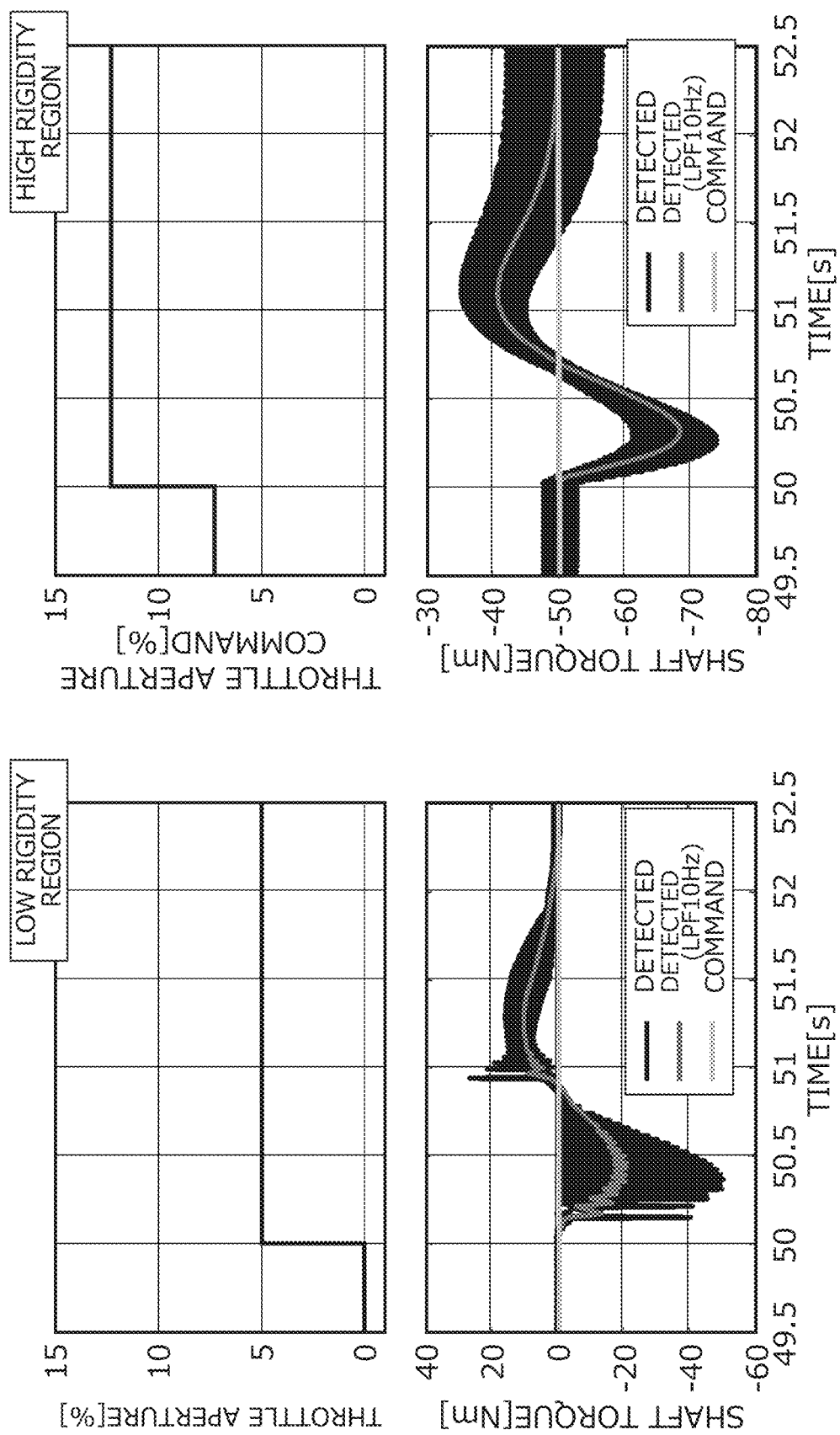
FIG. 10 provides graphs showing step responses of a throttle aperture command signal in a test system to which the shaft torque control device of the prior art is applied.
Figure 11:
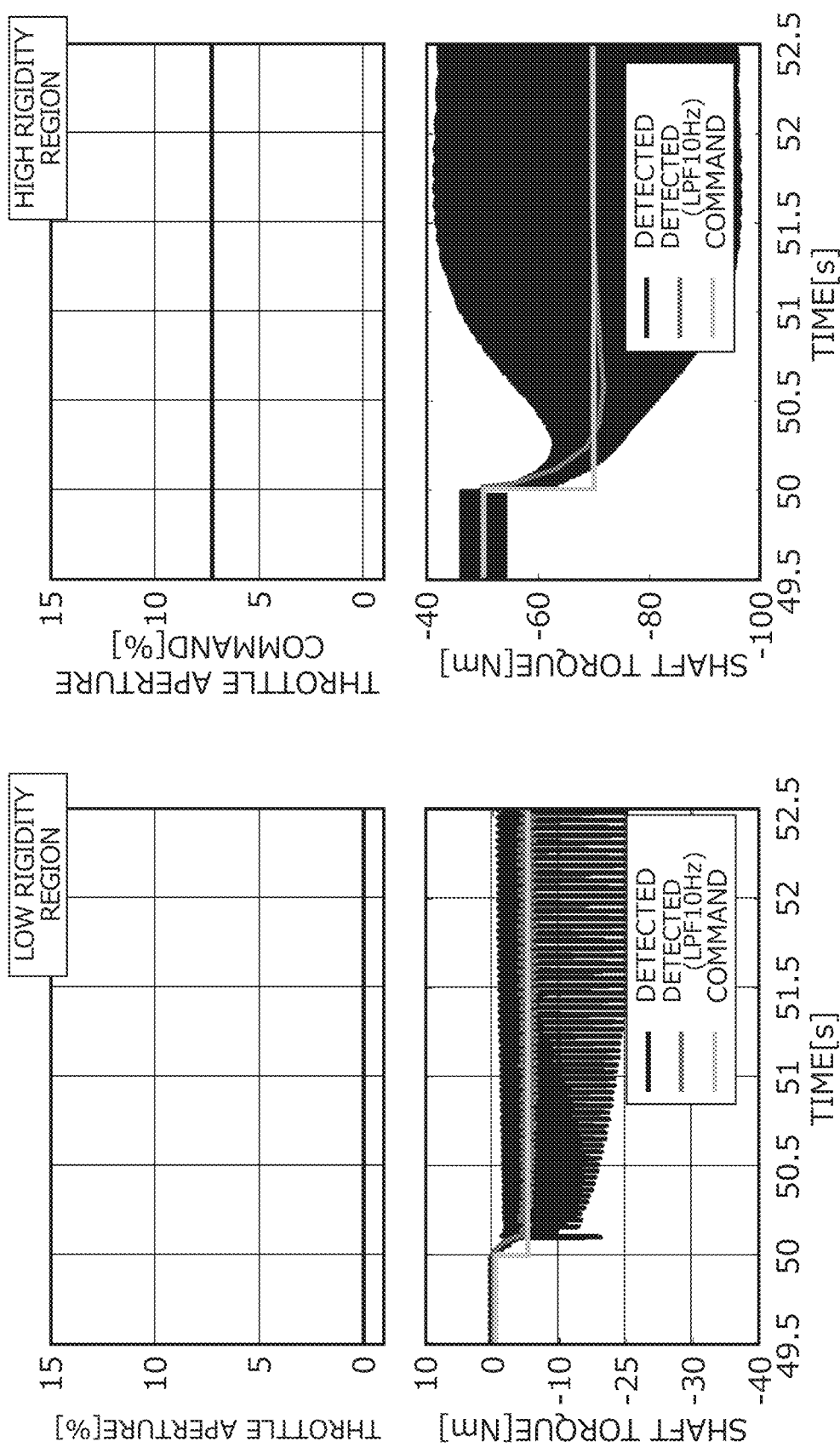
FIG. 11 provides graphs showing step responses of a shaft torque command signal in a test system to which the shaft torque control device of Example 1 is applied.
Figure 12:
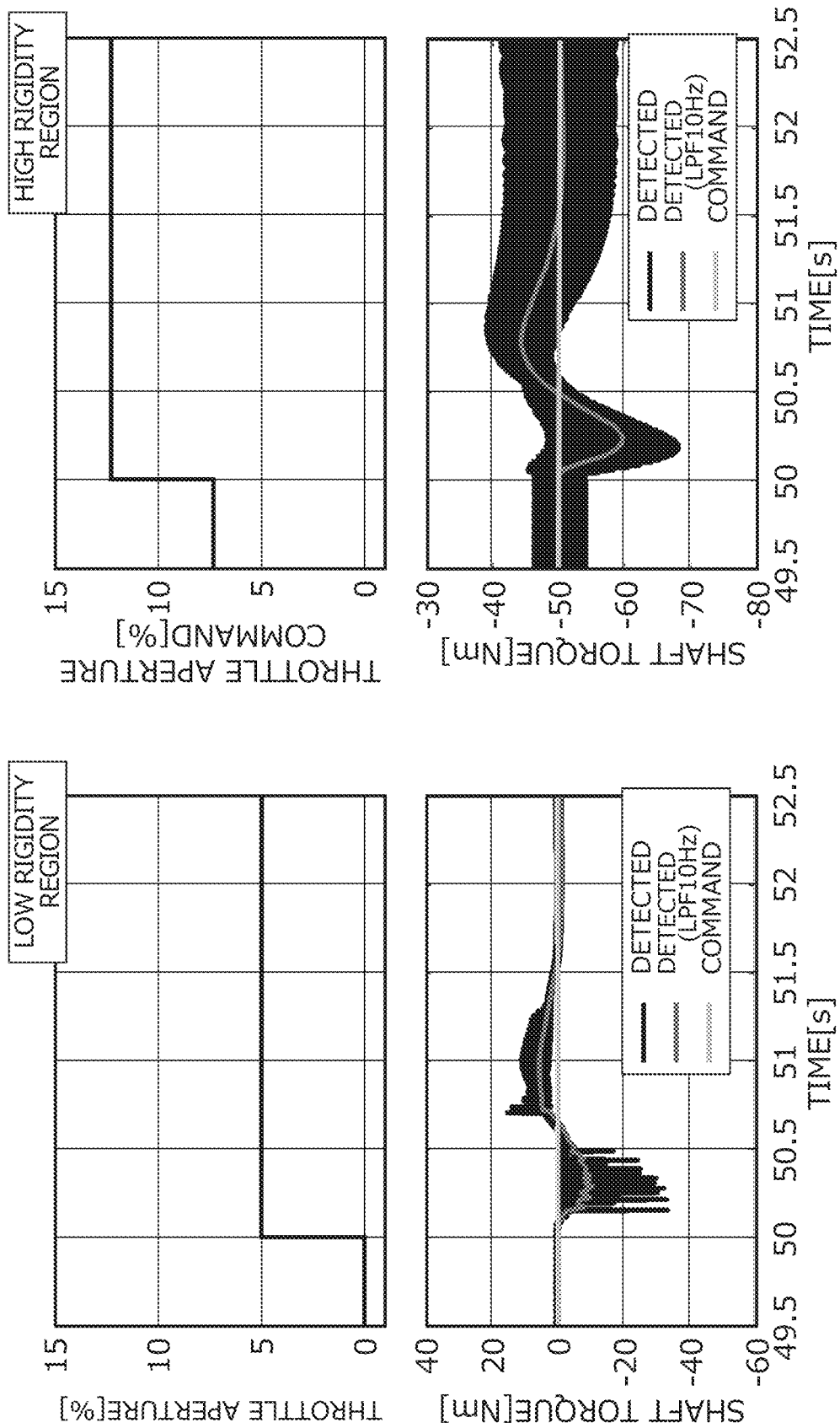
FIG. 12 provides graphs showing step responses of a throttle aperture command signal in a test system to which the shaft torque control device of Example 1 is applied.
Figure 13:
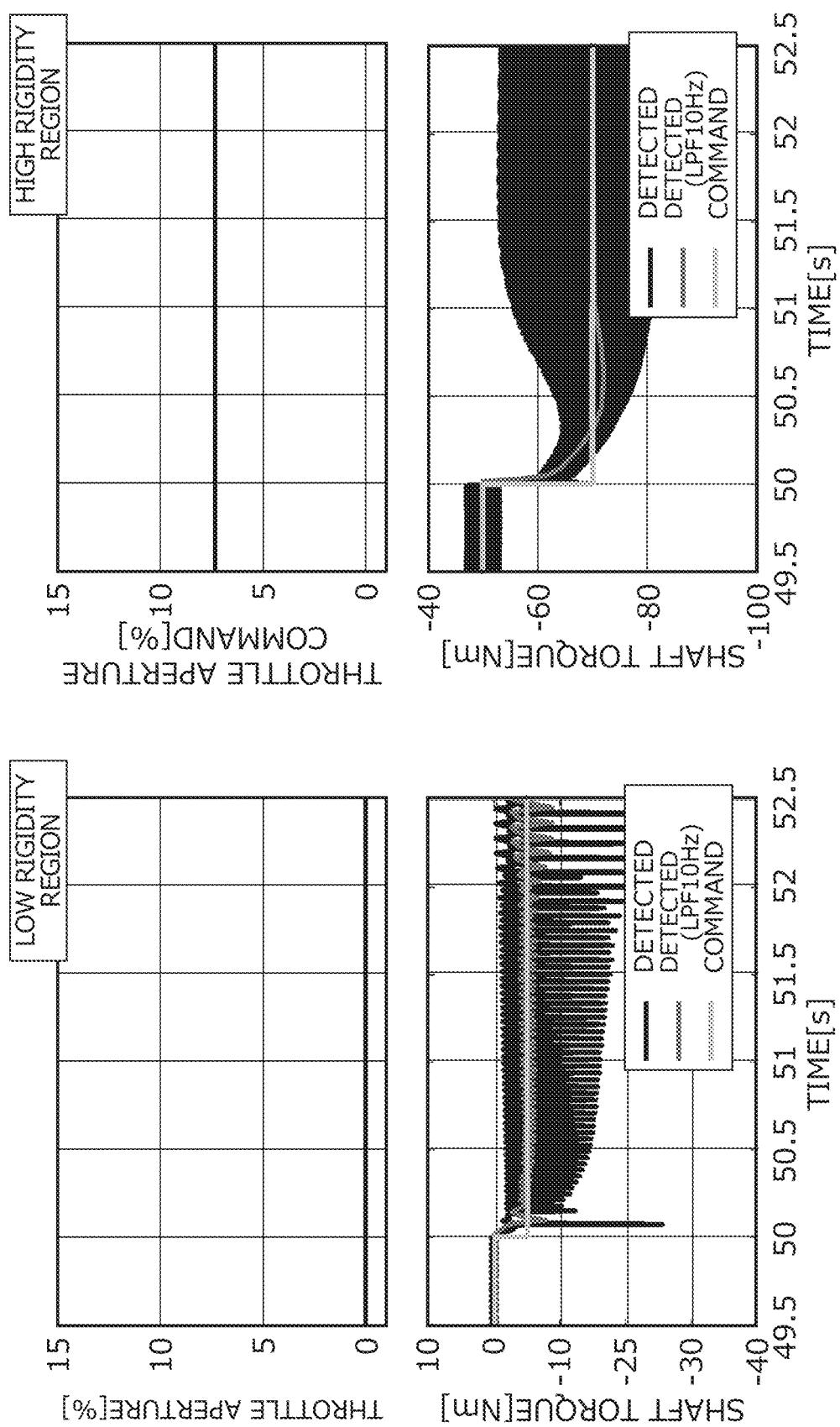
FIG. 13 provides graphs showing step responses of a shaft torque command signal in a test system to which the shaft torque control device of Example 2 is applied.
Figure 14:
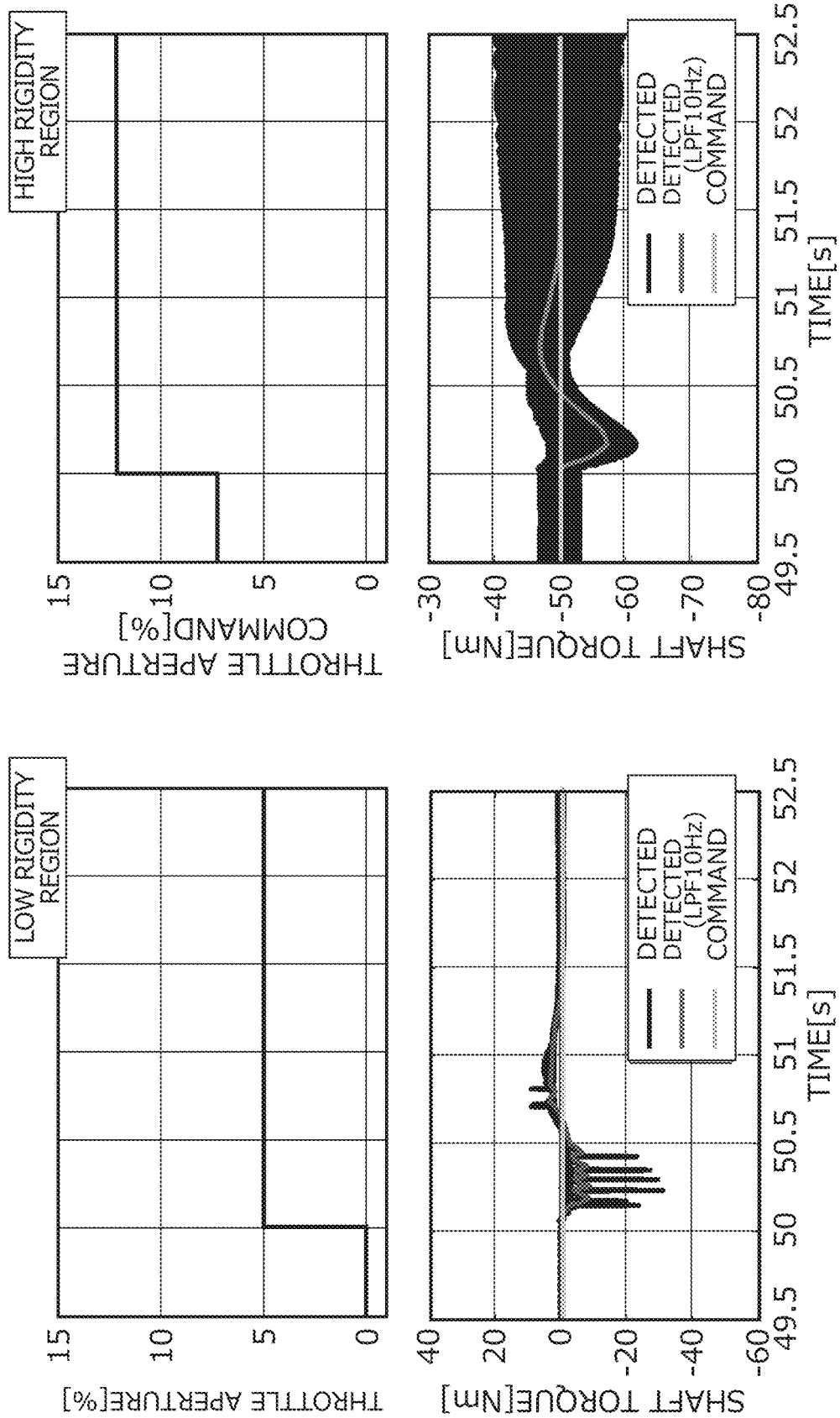
FIG. 14 provides graphs showing step responses of a throttle aperture command signal in a test system to which the shaft torque control device of Example 2 is applied.

FIG. 9 provides graphs showing step responses of a shaft torque command signal in the test system to which the shaft torque control device of the prior art is applied. FIG. 10 provides graphs showing step responses of a throttle aperture command signal in a test system to which the shaft torque control device of the prior art is applied;
FIG. 11 provides graphs showing step responses of a shaft torque command signal in a test system to which the shaft torque control device of Example 1 is applied. FIG. 12 provides graphs showing step responses of a throttle aperture command signal in a test system to which the shaft torque control device of Example 1 is applied. FIG. 13 provides graphs showing step responses of a shaft torque command signal in a test system to which the shaft torque control device of Example 2 is applied. FIG. 14 provides graphs showing step responses of a throttle aperture command signal in a test system to which the shaft torque control device of Example 2 is applied. FIGS. 9 to 14 show various responses at the time when the connection shaft is within a low rigidity region on the left side, and show various responses at the time when the connection shaft is within a high rigidity region on the right side. The tops of FIGS. 9 to 14 show the throttle aperture command signal. The bottoms of FIGS. 9 to 14 show the shaft torque detection signal and shaft torque command signal by changing the shading of each. Herein, noise caused by pulsating torque of the engine is included in the shaft torque detection signal. Therefore, the bottoms of FIGS. 9 to 14 also show the shaft torque command signal excluding the noise caused by the pulsating torque by using a 10 Hz low-pass filter for reference.

First, as shown on the left side in FIG. 9, according to the shaft torque control device of the prior art, in a state in which the connection shaft is in the low rigidity region, in regards to a shaft torque command signal which changes step-wise, it takes a time on the order of about 0.3 seconds until the shaft torque detection signal reaches this shaft torque command value. In contrast, according to the shaft torque control devices of Examples 1 and 2 as shown on the left sides of FIGS. 11 and 13, in a state in which the connection shaft is in a low rigidity region, the time until the shaft torque detection signal reaches the shaft torque command signal can be shortened to about 0.1 seconds.

Next, as shown on the right side in FIG. 9, according to the shaft torque control device of the prior art, in the state in which the connection shaft is within the high rigidity region, in regards to a shaft torque command signal which changes step-wise, the shaft torque detection signal overshoots, and it takes a time on the order of about 1.5 seconds until converging to the shaft torque command signal. In contrast, according to the shaft torque control device of Examples 1 and 2 as shown on the right side in FIGS. 11 and 13, in a state in which the connection shaft is within the high rigidity region, in regards to a step-wise change in the shaft torque command signal, the shaft torque detection signal almost no longer overshoots compared to the prior art, and arrives at the shaft torque command signal in on the order of about 0.2 seconds. The command responsiveness relative to the change in shaft torque command signal is considered higher for the shaft torque command devices of Examples 1 and 2 than the shaft torque command device of the prior art.

Next, as shown on the left side in FIG. 10, according to the shaft torque control device of the prior art, in a state in which the connection shaft is in a low-stiffness region, in regards to a throttle aperture command signal which changes step-wise, shaft torque variation on the order of about 20 Nm at most occurs, and requires a time on the order of about 2 seconds from the shaft torque detection signal moving away from the shaft torque command signal until returning again. In contrast, as shown on the left side in FIG. 12, according to the shaft torque control device of Example 1, in a state in which the connection shaft is in a low rigidity region, in regards to a step-wise change in the throttle aperture command signal, shaft torque variation can be suppress to on the order of about 7 Nm, and the time required until the shaft torque detection signal converges can be shortened to on the order of about 1.5 seconds. In addition, as shown on the left side in FIG. 14, according to the shaft torque control device of Example 2, in a state in which the connection shaft is in the low rigidity region, in regards to a step-wise change in the throttle aperture command signal, the shaft torque variation can be suppressed to on the order of about 5 Nm, and the time required until the shaft torque detection signal converges can be shortened to on the order of about 1.3 seconds. Therefore, the disturbance responsiveness to a variation in throttle aperture command signal, i.e. variation in engine torque, in a state in which the connection shaft is within the low rigidity region, is considered to be higher for the shaft torque control device of Example 2 than the shaft torque control device of Example 1.

In addition, as shown on the right side of FIG. 10, according to the shaft torque control device of the prior art, in a state in which the connection shaft is in the high stiffness region, in regards to a throttle aperture command signal which changes step-wise, shaft torque variation on the order of about 20 Nm at most occurs requires a time on the order of about 2 seconds from the shaft torque detection signal moving away from the shaft torque command signal until returning again. In contrast, as shown on the right side of FIG. 12, according to the shaft torque control device of Example 1, in a state in which the connection shaft is in a high rigidity region, in regards to a step-wise change in the throttle aperture command signal, the shaft torque variation can be suppressed to on the order of 10 Nm, and the time required until the shaft torque detection signal converges can be shortened to on the order of about 1.5 seconds. In addition, as shown on the right side in FIG. 14, according to the shaft torque control device of Example 1, in a state in which the connection shaft is in a high rigidity region, in regards to a step-wise change in the throttle aperture command signal, the shaft torque variation can be suppressed to on the order of about 5 Nm, and the time required until the shaft torque detection signal converges can be shortened to on the order of about 1.2 seconds. Therefore, the disturbance responsiveness relative to engine torque variation, in a state in which the connection shaft is within the high rigidity region, is considered higher for the shaft torque control device of Example 2 than the shaft torque control device of Example 1.

According to the above, the shaft torque control devices of Examples 1 and 2, in the case of applying to a test system including a connection shaft for which the spring rigidity greatly varies, can both raise the command responsiveness relative to the shaft torque command signal and the disturbance responsiveness relative to engine torque more than the shaft torque control device of the prior art.

Example 3

Figure 15:
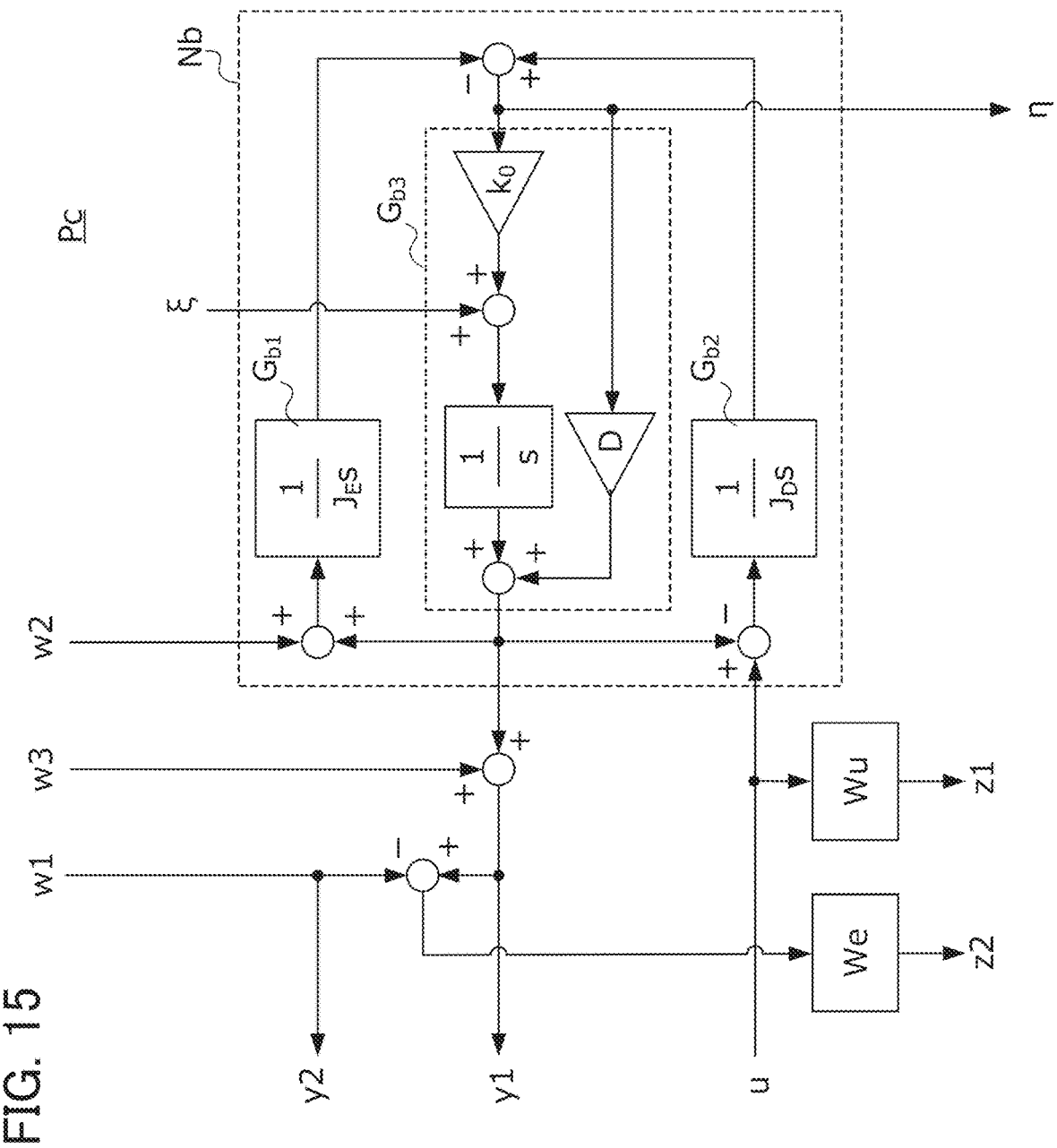
FIG. 15 is a view showing the configuration of a generalized plant used in the design of a shaft torque control device of Example 3.

Next, the shaft torque control device of Example 3 and the design method thereof will be explained. FIG. 15 is a view showing the configuration of a generalized plant Pc used in the design of a shaft torque control device of Example 3. The generalized plant Pc of Example 3 differs from the generalized plant Pb of Example 2 shown in FIG. 6 in the point of a third disturbance input w3 being newly set, the point of a weighting function not being set for the second disturbance input w2, the point of a weighting function not being set for the variation input η, and the configuration of the variation transfer function $\Delta_{PR}(s)$. In the following explanation of the generalized plant Pc, explanations for configurations which are the same as the generalized plant Pb will be omitted.

In the generalized plant Pc of FIG. 15, a plurality of input-output signals is defined consisting of the first disturbance input w1, second disturbance input w2, third disturbance input w3, first evaluation output z1, second evaluation output z2, control input u, first observation output y1, second observation output y2, variation input η and variation output ξ.

The third disturbance input w3 is an input signal to the generalized plant Pc, and corresponds to the shaft torque detection disturbance. The first observation output y1 is an input signal to the controller K from the generalized plant Pc, and corresponds to the shaft torque detection signal. As this first observation output y1, an output produced by adding the third disturbance input w3 corresponding to the shaft torque detection disturbance to the output of the nominal plant Nb can be used.

The variation input η is an input signal from the generalized plant Pb to the variation transfer function $\Delta_{PR}(s)$ of the variation term Δ, and the variation output ξ is an input signal from the variation transfer function $\Delta_{PR}(s)$ to the generalized plant Pc. As shown in FIG. 15, this variation input η and variation output ξ are set so as to impart additive variation to the nominal value $k_0$ of the spring rigidity of the shaft in the nominal plant Nb.

Figure 16:
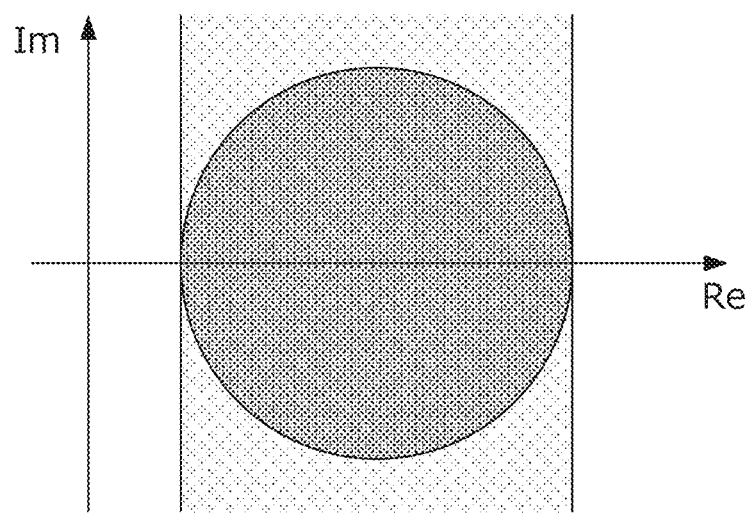
FIG. 16 is a graph showing the range in which a variation transfer function of Example 3 is defined.

In addition, the variation transfer function $\Delta_{PR}(s)$, as shown in the dark grey in FIG. 16, shall be a complex number in the range of a circle having a center set on the real axis of the complex plane. It should be noted that, in the generalized plant Pb of Example 2, although the variation range is limited by δ, which is a real number of at least 0 and no greater than 1 as shown in Formula (12-2), a restriction is not added to the imaginary range. For this reason, with a design method based on the generalized plant Pb of Example 2, as shown by the dark grey in FIG. 16, the variation range will consider so far as the infinite direction on the imaginary axis; whereas, with the generalized plant Pc of Example 3, due to being limited to a finite range for both the real axis and imaginary axis, it is possible to set the variation range narrower than Example 2. For this reason, according to the generalized plant Pc of Example 3, it is possible to improve the control performance, while raising the robustness relative to the stiffness change in a range considering the actual machine characteristics.

The shaft torque control device of Example 3 is set so as to satisfy the design conditions shown in Formulas (8-1) and (8-2) in the feedback control system in which the above such generalized plant Pc is stipulated.

Figure 17A:
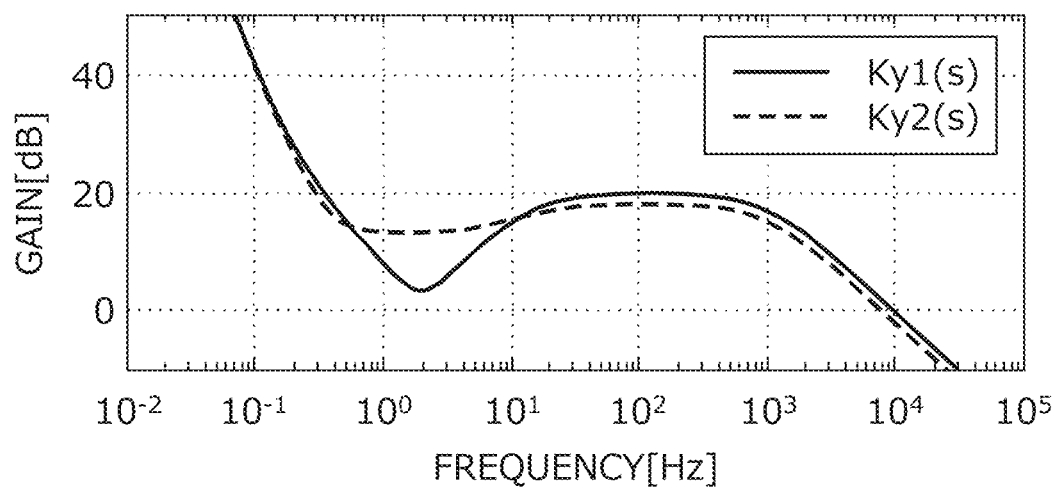
FIG. 17A is a graph showing gain characteristics of a shaft torque control device of Example 3.
Figure 17B:
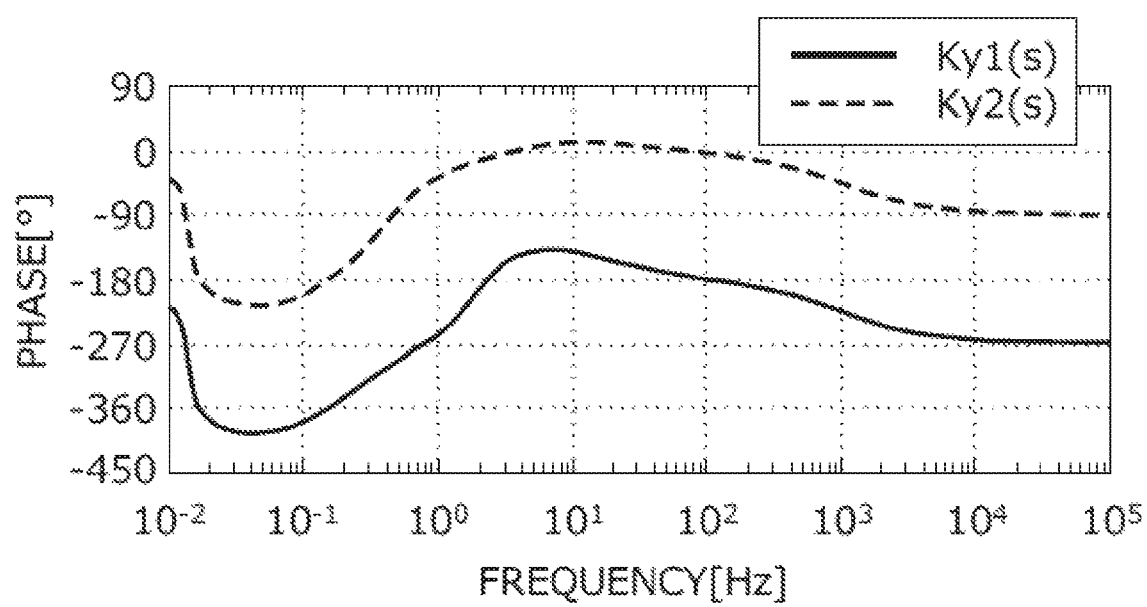
FIG. 17B is a graph showing phase characteristics of a shaft torque control device of Example 3.

FIGS. 17A and 17B are graphs showing gain characteristics and phase characteristics of the shaft torque control device of Example 3, respectively. FIGS. 17A and 17B show the gain characteristics and phase characteristics (i.e. characteristics of Ky1(s) in FIG. 4) of the torque current command signal relative to the shaft torque detection signal of the shaft torque control device of Example 3 by a solid line, and show the gain characteristics and phase characteristics (i.e. characteristics of Ky2(s) in FIG. 4) of the torque current command signal relative to the shaft torque command signal by a dashed line. According to the generalized plant Pc of Example 3, it is possible to design a shaft torque control device possessing characteristics of equivalent extent to Example 2.

Next, the performance of the shaft torque control device of Example 3 will be explained while comparing with the shaft torque control device of Example 2.

Figure 18:
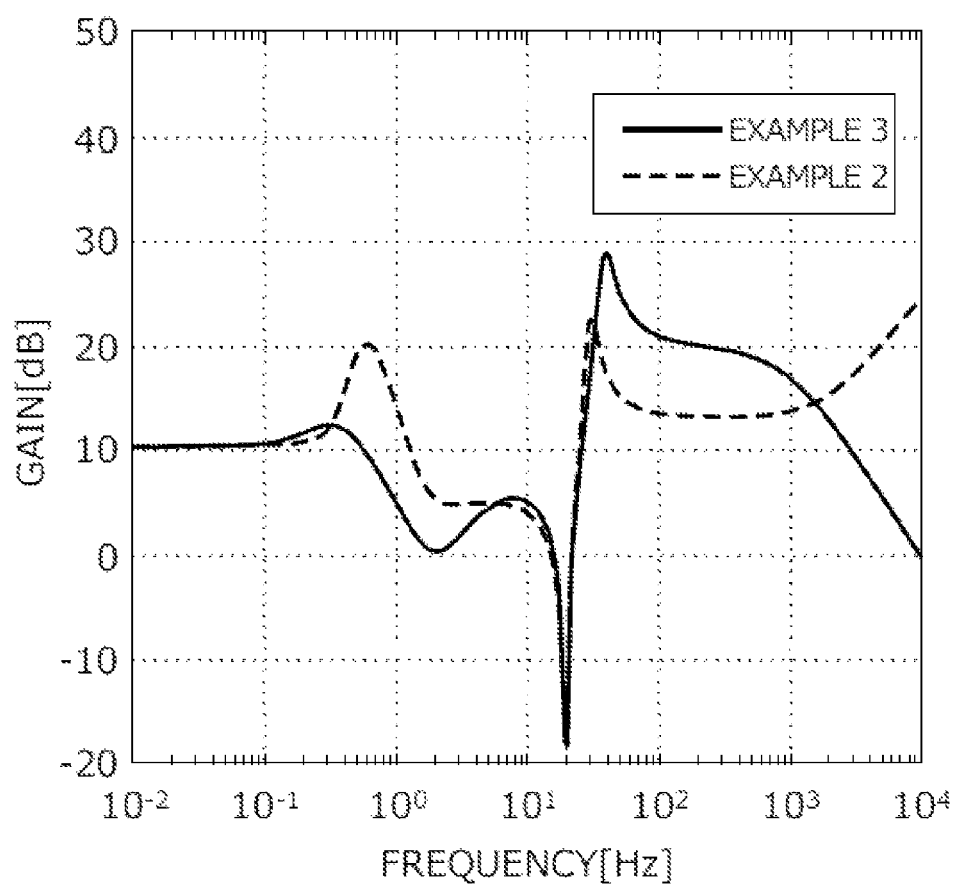
FIG. 18 is a graph showing a frequency response of shaft torque control devices of Example 3 and Example 2.

FIG. 18 is a graph showing a frequency response (i.e. ratio of torque current command signal to noise of shaft torque detection signal) of the shaft torque control devices of Example 3 and Example 2. As shown in FIG. 18, the noise gain response of both Example 3 and Example 2 become no more than 30 dB, and thus high stability and noise reduction performance are obtained for both. However, according to the shaft torque control device of Example 2, a gain rise in the high frequency region is recognized. In contrast, according to the shaft torque control device of Example 3, the gain can be reduced in the high frequency region, and thus higher stability and noise reduction performance are obtained compared to the shaft torque control device of Example 2.

Figure 19A:
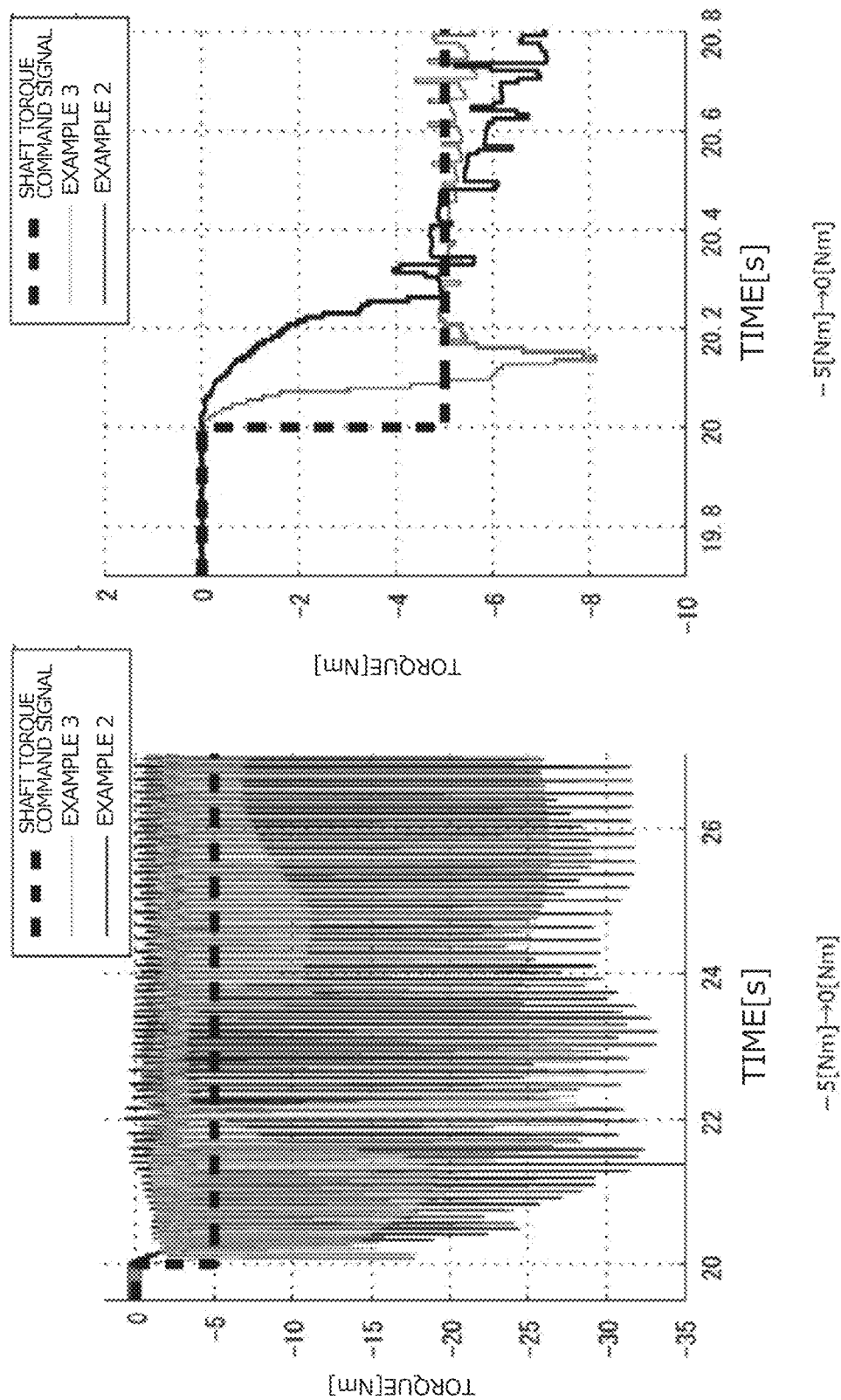
FIG. 19A is a graph showing a step responses of a shaft torque command signal in the test system to which the shaft torque control devices of Example 3 and Example 2 are applied.

FIG. 19A and FIG. 19B are graphs showing step responses of a shaft torque command signal in the test systems to which the shaft torque control devices of Example 3 and Example 2 are applied. More specifically, FIG. 19A shows the responses in the case of step-wise changing the shaft torque command signal from 0 (Nm) to −5 (Nm), and FIG. 19B shows the responses in the case of step-wise changing the shaft torque command signal from −5 (Nm) to 0 (Nm). In addition, the raw waveform relative to input is shown on the left side of FIG. 19A and FIG. 19B, and the product of conducting moving average processing on this raw waveform is shown on the right side.

At the moment when the shaft torque command signal changes step-wise in both Example 3 and Example 2, oscillation occurs in the torque current command signal due to the influence from resonance and the change in spring rigidity. As shown in FIG. 19A and FIG. 19B, according to the shaft torque control device of Example 3, the fast-response relative to the change in shaft torque command signal is higher, overshoot is smaller, and resonance frequency width is smaller compared to the shaft torque control device of Example 2. In the case of applying the shaft torque control device of Example 3 to an engine bench system in which the spring rigidity of the clutch greatly varies in the above way, it is possible to realize highly responsive control for both command value response and disturbance response than the shaft torque control device of Example 2.

Although an embodiment of the present invention has been explained above, the present invention is not to be limited thereto. Configurations of detailed parts may be modified where appropriate within the scope of the gist of the present invention. For example, the above embodiment explains a case of applying the shaft torque control devices of Examples 1 and 2 to a test system designated as a so-called engine bench system with the engine of a vehicle as the test piece; however, the present invention is not limited thereto. The shaft torque control devices of Examples 1 and 2 may be applied to a test system designated as a so-called drive-train bench system with the drive train of a vehicle as the test piece.

EXPLANATION OF REFERENCE NUMERALS

S test system
E engine (test piece)
2 dynamometer
3 connection shaft
5 shaft torque meter
7 shaft torque control device
8 feedback control system
P, Pa, Pb generalized plant N, Na, Nb nominal plant
K controller
Δ variation term
$\Delta_{PR}(s)$ variation transfer function
$k_0$ nominal value of spring rigidity
$k_{min}$ lower limit value of variation range of spring rigidity
$k_{max}$ upper limit value of variation range of spring rigidity
u control input
w1 first disturbance input
w2 second disturbance input
z1 first evaluation output
z2 second evaluation output
y1 first observation output
Wu first weighting function
We second weighting function
Wd third weighting function
Wη fourth weighting function

The invention claimed is:

1. A shaft torque control device in a test system that includes: a test piece which generates torque according to a test piece input, a dynamometer which generates torque according to a torque current command signal, a connection shaft which has a characteristic of a spring rigidity thereof varying and connects the test piece and the dynamometer, and a shaft torque meter which detects a shaft torque in the connection shaft, the shaft torque control device generating the torque current command signal using a shaft torque detection signal of the shaft torque meter and a shaft torque command signal related to this shaft torque detection signal,
wherein, in a feedback control system including: a nominal plant imitating an input-output characteristic of the test system from the test piece input and the torque current command signal until the shaft torque detection signal; a generalized plant having the nominal plant; a controller which gives an input of the generalized plant using output of the generalized plant; and a variation term which imparts variation based on a predetermined variation transfer function to the nominal plant, the shaft torque control device comprises the controller which is set so as to satisfy a predetermined design condition,
wherein the nominal plant is constructed based on a two-inertia system configured by connecting two inertia fields by a shaft having a spring rigidity of a predetermined nominal value,
wherein the nominal value is set as a lower limit value in a variation range assumed at a spring rigidity of the connection shaft,
wherein the variation transfer function is a positive real function and is set so as to cause the spring rigidity of the nominal plant to increase from the nominal value, and
wherein the design condition is satisfying an inequality equation below relative to an arbitrary frequency ω, when defining a disturbance input and evaluation output in the feedback control system as w and z, respectively, defining a variation input and variation output in the variation term as η and ξ, respectively, and defining complex conjugate transpositions of the inputs/outputs w, z, η, ξ as w*, z*, η*, ξ*, respectively.

$$\xi^*\eta + \eta^*\xi \geq 0 \quad \forall \omega, \eta(j\omega) \tag{1-1}$$

$$z^*z - w^*w < 0 \quad \forall \omega, w(j\omega)) \tag{1-2}$$

2. The shaft torque control device according to claim 1, wherein variation input η and variation output ξ of the variation term are set so as to impart additive variation to the nominal value $k_0$ of spring rigidity in the nominal plant,
wherein a fourth weighting function Wη is set for the variation input and
wherein the fourth weighting function Wη and the variation transfer function $\Delta_{PR}$ are expressed by the below formulas with $k_{min}$ and $k_{max}$ defined as lower limit value and upper limit value of a variation range assumed for the spring rigidity of the connection shaft, respectively, and δ as a real number of at least 0 and no greater than 1.

$$W\eta = k_{max} - k_{min} \tag{7-1}$$

$$\Delta_{PR} = \delta \tag{7-2}$$

3. The shaft torque control device according to claim 1, wherein variation input η and variation output ξ of the variation term are set so as to impart additive variation to the nominal value $k_0$ of the spring rigidity in the nominal plant, and
wherein the variation transfer function is a complex number in the range of a circle having a center set on the real axis of a complex plane.

4. The shaft torque control device according to claim 1, wherein, in the feedback control system, an input produced by weighting a second disturbance input corresponding to the test piece input by a predetermined third weighting function is inputted to the nominal model, and
wherein the third weighting function has larger gain in a specific frequency band in which variation torque of the test piece increases.

5. The shaft torque control device according to claim 4, wherein variation input η and variation output ξ of the variation term are set so as to impart additive variation to the nominal value $k_0$ of spring rigidity in the nominal plant,
wherein a fourth weighting function is set for the variation input η, and
wherein the fourth weighting function Wη and the variation transfer function $\Delta_{PR}$ are expressed by the below formulas with $k_{min}$ and $k_{max}$ defined as lower limit value and upper limit value of a variation range assumed for the spring rigidity of the connection shaft, respectively, and δ as a real number of at least 0 and no greater than 1.

$$W\eta = k_{max} - k_{min} \tag{10-1}$$

$$\Delta_{PR} = \delta \tag{10-2}$$

6. The shaft torque control device according to claim 1, wherein the nominal plant is constructed based on a two-inertia system configured by connecting a first inertia field having a moment of inertia of the test piece and a second inertia field having a moment of inertia of the dynamometer, by a shaft having a spring rigidity of nominal value $k_0$ and loss of nominal value D,
wherein, in a case of defining a transfer function from a speed difference between the first inertia field and the second inertia field until the shaft torque detection signal in the nominal plant as $G_{a3}(s)$, a variation input η and variation output ξ of the variation term are set so as to impart multiplicative variation to the transfer function $G_{a3}(s)$, and
wherein the transfer function $G_{a3}(s)$ and the variation transfer function $\Delta_{PR}(s)$ are represented by the formulas below with $\delta_D$ and $\delta_K$ as real numbers of at least 0.

$$G_{a3}(s) = \frac{Ds + k_0}{s} \qquad (5\text{-}1)$$

$$\Delta_{PR}(s) = \frac{\delta_D s + \delta_K}{Ds + k_0}. \qquad (5\text{-}2)$$

7. The shaft torque control device according to claim 6, wherein, in a case of defining the moment of inertia of the test piece as $J_E$, defining the moment of inertia of the dynamometer as $J_D$, and defining a minute constant as $T_\Delta$, a transfer function $G_{a1}(s)$ from the sum of torque of the first inertia body and torque of the shaft until revolution speed of the first inertia field and a transfer function $G_{a2}(s)$ from the difference between torque of the second inertia field and torque of the shaft until revolution speed of the second inertia field in the nominal plant are expressed by the formulas below, respectively.

$$G_{a1}(s) = \frac{T_\Delta s + 1}{J_E s} \qquad (6\text{-}1)$$

$$G_{a2}(s) = \frac{T_\Delta s + 1}{J_D s}. \qquad (6\text{-}2)$$

8. The shaft torque control device according to claim 1, wherein, in the feedback control system, an output produced by weighting a difference between a first disturbance input corresponding to the shaft torque command signal and an output of the nominal plant corresponding to the shaft torque detection signal by a predetermined second weighting function is defined as a second evaluation output, and
   wherein the second weighing function has an integral characteristic.

9. The shaft torque control device according to claim 8, wherein variation input η and variation output ξ of the variation term are set so as to impart additive variation to the nominal value $k_0$ of spring rigidity in the nominal plant,
   wherein a fourth weighting function Wη is set for the variation input η, and
   wherein the fourth weighting function Wη and the variation transfer function $\Delta_{PR}$ are expressed by the below formulas with $k_{min}$ and $k_{max}$ defined as lower limit value and upper limit value of a variation range assumed for the spring rigidity of the connection shaft, respectively, and δ as a real number of at least 0 and no greater than 1.

$$W\eta = k_{max} - k_{min} \qquad (9\text{-}1)$$

$$\Delta_{PR} = \delta \qquad (9\text{-}2)$$

10. The shaft torque control device according to claim 8, wherein variation input η and variation output ξ of the variation term are set so as to impart additive variation to the nominal value $k_0$ of the spring rigidity in the nominal plant, and
    wherein the variation transfer function is a complex number in the range of a circle having a center set on the real axis of a complex plane.

11. The shaft torque control device according to claim 1, wherein the controller in the feedback control system inputs a control input corresponding to the torque current command signal to the nominal plant, and an output produced by weighting the control input by a predetermined first weighting function is defined as a first evaluation output, and
    wherein the first weighting function has larger gain in a high-frequency band than in a low-frequency band.

12. The shaft torque control device according to claim 11, wherein, in the feedback control system, an input produced by weighting a second disturbance input corresponding to the test piece input by a predetermined third weighting function is inputted to the nominal model, and
    wherein the third weighting function has larger gain in a specific frequency band in which variation torque of the test piece increases.

13. The shaft torque control device according to claim 11, wherein variation input η and variation output ξ of the variation term are set so as to impart additive variation to the nominal value $k_0$ of spring rigidity in the nominal plant,
    wherein a fourth weighting function Wη is set for the variation input and
    wherein the fourth weighting function Wη and the variation transfer function $\Delta_{PR}$ are expressed by the below formulas with $k_{min}$ and $k_{max}$ defined as lower limit value and upper limit value of a variation range assumed for the spring rigidity of the connection shaft, respectively, and δ as a real number of at least 0 and no greater than 1.

$$W\eta = k_{max} - k_{min} \qquad (8\text{-}1)$$

$$\Delta_{PR} = \delta \qquad (8\text{-}2)$$

14. The shaft torque control device according to claim 11, wherein variation input η and variation output ξ of the variation term are set so as to impart additive variation to the nominal value $k_0$ of the spring rigidity in the nominal plant, and
    wherein the variation transfer function is a complex number in the range of a circle having a center set on the real axis of a complex plane.

15. The shaft torque control device according to claim 11, wherein, in the feedback control system, an output produced by weighting a difference between a first disturbance input corresponding to the shaft torque command signal and an output of the nominal plant corresponding to the shaft torque detection signal by a predetermined second weighting function is defined as a second evaluation output, and
    wherein the second weighing function has an integral characteristic.

16. The shaft torque control device according to claim 15, wherein variation input η and variation output ξ of the variation term are set so as to impart additive variation to the nominal value $k_0$ of the spring rigidity in the nominal plant, and
    wherein the variation transfer function is a complex number in the range of a circle having a center set on the real axis of a complex plane.

17. The shaft torque control device according to claim 15, wherein, in the feedback control system, an input produced by weighting a second disturbance input corresponding to the test piece input by a predetermined third weighting function is inputted to the nominal model, and
    wherein the third weighting function has larger gain in a specific frequency band in which variation torque of the test piece increases.

18. The shaft torque control device according to claim 17, wherein variation input η and variation output ξ of the variation term are set so as to impart additive variation to the nominal value $k_0$ of spring rigidity in the nominal plant,
    wherein a fourth weighting function Wη is set for the variation input η, and
    wherein the fourth weighting function Wη and the variation transfer function $\Delta_{PR}$ are expressed by the below formulas with $k_{min}$ and $k_{max}$ defined as lower limit value and upper limit value of a variation range assumed for the spring rigidity of the connection shaft, respectively, and δ as a real number of at least 0 and no greater than 1.

$$W\eta = k_{max} - k_{min} \quad (4\text{-}1)$$

$$\Delta_{PR} = \delta \quad (4\text{-}2)$$

19. The shaft torque control device according to claim 17, wherein the nominal plant is constructed based on a two-inertia system configured by connecting a first inertia field having a moment of inertia of the test piece and a second inertia field having a moment of inertia of the dynamometer, by a shaft having a spring rigidity of nominal value $k_0$ and loss of nominal value D, wherein, in a case of defining a transfer function from a speed difference between the first inertia field and the second inertia field until the shaft torque detection signal in the nominal plant as $G_{a3}(s)$, a variation input ξ and variation output $\bar{\xi}$ of the variation term are set so as to impart multiplicative variation to the transfer function $G_{a3}(s)$, and wherein the transfer function $G_{a3}(s)$ and the variation transfer function $\Delta_{PR}(s)$ are represented by the formulas below with $\delta_D$ and $\delta_K$ as real numbers of at least 0.

$$G_{a3}(s) = \frac{Ds + k_0}{s} \quad (2\text{-}1)$$

$$\Delta_{PR}(s) = \frac{\delta_D s + \delta_K}{Ds + k_0}. \quad (2\text{-}2)$$

20. The shaft torque control device according to claim 19, wherein, in a case of defining the moment of inertia of the test piece as $J_E$, defining the moment of inertia of the dynamometer as $J_D$, and defining a minute constant as $T_A$, a transfer function $G_{a1}(s)$ from the sum of torque of the first inertia body and torque of the shaft until revolution speed of the first inertia field and a transfer function $G_{a2}(s)$ from the difference between torque of the second inertia field and torque of the shaft until revolution speed of the second inertia field in the nominal plant are expressed by the formulas below, respectively.

$$G_{a1}(s) = \frac{T_A s + 1}{J_E s} \quad (3\text{-}1)$$

$$G_{a2}(s) = \frac{T_A s + 1}{J_D s}. \quad (3\text{-}2)$$

* * * * *